United States Patent
Yoon et al.

(10) Patent No.: US 11,384,949 B2
(45) Date of Patent: Jul. 12, 2022

(54) AIR CONDITIONER SYSTEM AND CONTROL METHOD THEREOF

(71) Applicant: Samsung Electronics Co., Ltd., Suwon-si (KR)

(72) Inventors: Hyun Jin Yoon, Suwon-si (KR); Je Heon Lee, Suwon-si (KR); Tae Duk Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 16/759,086

(22) PCT Filed: Oct. 2, 2018

(86) PCT No.: PCT/KR2018/011709
§ 371 (c)(1),
(2) Date: Apr. 24, 2020

(87) PCT Pub. No.: WO2019/083186
PCT Pub. Date: May 2, 2019

(65) Prior Publication Data
US 2020/0348037 A1    Nov. 5, 2020

(30) Foreign Application Priority Data
Oct. 24, 2017    (KR) ........................ 10-2017-0138153

(51) Int. Cl.
| | |
|---|---|
| F24F 11/46 | (2018.01) |
| F24F 11/49 | (2018.01) |
| F24F 11/52 | (2018.01) |
| F24F 11/56 | (2018.01) |
| F24F 1/0007 | (2019.01) |
| F24F 1/26 | (2011.01) |
| F24F 3/00 | (2006.01) |

(Continued)

(52) U.S. Cl.
CPC ............ *F24F 11/46* (2018.01); *F24F 1/0007* (2013.01); *F24F 1/26* (2013.01); *F24F 3/00* (2013.01);
(Continued)

(58) Field of Classification Search
CPC .. F24F 11/46; F24F 1/0007; F24F 1/26; F24F 3/00; F24F 11/49; F24F 11/52;
(Continued)

(56) References Cited

U.S. PATENT DOCUMENTS

| | | | |
|---|---|---|---|
| 7,287,393 B2 | 10/2007 | Kwon et al. | |
| 8,655,492 B2 | 2/2014 | Wakuta et al. | |

(Continued)

FOREIGN PATENT DOCUMENTS

| | | |
|---|---|---|
| JP | 2004-218879 A | 8/2004 |
| JP | 2008134013 A | 6/2008 |

(Continued)

OTHER PUBLICATIONS

International Search Report dated Feb. 8, 2019 in connection with International Patent Application No. PCT/KR2018/011709, 2 pages.

(Continued)

*Primary Examiner* — Ramesh B Patel

(57) ABSTRACT

Disclosed herein are an air conditioner system and a controlling method thereof. In a situation that air-conditioning systems such as air conditioners and refrigerators are installed and operated in a site, real-time operation data are acquired and the air conditioning and efficiency are calculated at the site. By comparing performance data provided by a device manufacturer and the real-time operation data, device performance is corrected for the site's installation environment. By using corrected device performance, it is possible to save building facility energy by providing optimal operation number control suitable for the installation environment.

16 Claims, 15 Drawing Sheets

(51) Int. Cl.
*F24F 11/62* (2018.01)
*F24F 11/64* (2018.01)
*F24F 11/65* (2018.01)
*G05B 13/02* (2006.01)
*F24F 110/00* (2018.01)

(52) U.S. Cl.
CPC ............. *F24F 11/49* (2018.01); *F24F 11/52* (2018.01); *F24F 11/56* (2018.01); *F24F 11/62* (2018.01); *F24F 11/64* (2018.01); *F24F 11/65* (2018.01); *G05B 13/024* (2013.01); *F24F 2110/00* (2018.01)

(58) Field of Classification Search
CPC .. F24F 11/56; F24F 11/62; F24F 11/64; F24F 11/65; F24F 2110/00; F24F 11/30; F24F 2140/12; F24F 2140/20; F24F 2140/50; F24F 11/63; G05B 13/024; G05B 15/02; G05B 2219/2614
See application file for complete search history.

(56) References Cited

U.S. PATENT DOCUMENTS

| | | | | |
|---|---|---|---|---|
| 2018/0195749 | A1* | 7/2018 | Sinha | F24F 11/63 |
| 2018/0283752 | A1* | 10/2018 | Yoon | F25B 49/02 |
| 2018/0341255 | A1* | 11/2018 | Turney | G05B 23/0283 |
| 2018/0373234 | A1* | 12/2018 | Khalate | G06N 7/005 |
| 2019/0101304 | A1* | 4/2019 | Yoon | F24F 11/58 |
| 2020/0090289 | A1* | 3/2020 | Elbsat | G06Q 50/163 |
| 2020/0356087 | A1* | 11/2020 | Elbsat | G05B 23/0254 |
| 2020/0393178 | A1* | 12/2020 | Kumakura | C09K 5/045 |

FOREIGN PATENT DOCUMENTS

| | | |
|---|---|---|
| JP | 2009-150640 A | 7/2009 |
| JP | 2011-089683 A | 5/2011 |
| JP | 2012-007887 A | 1/2012 |
| KR | 10-2004-0110523 A | 12/2004 |
| KR | 10-2010-0069181 A | 6/2010 |
| KR | 10-2013-0120865 A | 11/2013 |

OTHER PUBLICATIONS

Written Opinion of the International Searching Authority dated Feb. 8, 2019 in connection with International Patent Application No. PCT/KR2018/011709, 6 pages.

Notice of Preliminary Rejection dated Dec. 15, 2021, in connection with Korean Application No. 10-2017-0138153, 9 pages.

Notice of Patent Allowance dated Feb. 22, 2022, in connection with Korean Application No. 10-2017-0138153, 3 pages.

* cited by examiner

FIG.8

| MODE | MODE | PRESSURE CHANGE | CAPACITY CHANGE | EFFICIENCY CHANGE |
|---|---|---|---|---|
| COOLING MODE | LOW TEMPERATURE CONTROL | LOW PRESSURE ↑ | COOLING CAPACITY ↓ | EFFICIENCY ↑ |
| | | LOW PRESSURE ↓ | COOLING CAPACITY ↑ | EFFICIENCY ↓ |
| HEATING MODE | HIGH TEMPERATURE CONTROL | HIGH PRESSURE ↑ | HEATING CAPACITY ↑ | EFFICIENCY ↓ |
| | | HIGH PRESSURE ↓ | HEATING CAPACITY ↓ | EFFICIENCY ↑ |

FIG.11

| Combination,% (Capacity index) | Outdoor Temperature(°F) | Indoor Temperature(°F,WB) | | | | | | | |
|---|---|---|---|---|---|---|---|---|---|
| | | 57°F | | 61°F | | 64°F | | 67°F | |
| | | TC | PI | TC | PI | TC | PI | TC | PI |
| | | MBH | kW | MBH | kW | MBH | kW | MBH | kW |
| 90 | 73 | 119 | 5.61 | 142 | 6.5 | 166 | 7.47 | 175 | 7.72 |
| | 77 | 119 | 5.92 | 142 | 6.86 | 166 | 7.87 | 175 | 8.13 |
| | 80 | 119 | 6.36 | 142 | 7.34 | 166 | 8.43 | 175 | 8.68 |
| | 84 | 119 | 6.8 | 142 | 7.84 | 166 | 9 | 175 | 9.26 |
| | 88 | 119 | 7.26 | 142 | 8.36 | 166 | 9.58 | 175 | 9.84 |
| | 92 | 119 | 7.77 | 142 | 8.92 | 166 | 10.22 | 175 | 10.47 |
| | 95 | 119 | 8.32 | 142 | 9.53 | 166 | 10.91 | 175 | 11.16 |
| | 99 | 119 | 9 | 142 | 10.26 | 166 | 11.74 | 175 | 11.8 |
| | 103 | 119 | 9.91 | 142 | 11.29 | 166 | 12.88 | 175 | 12.86 |
| | 107 | 118 | 10.98 | 141 | 12.45 | 165 | 14.16 | 173 | 14.17 |
| | 111 | 112 | 11.65 | 134 | 13.17 | 156 | 14.94 | 166 | 14.79 |
| | 115 | 103 | 11.81 | 124 | 13.3 | 144 | 14.93 | 142 | 14.76 |
| | 118 | 97 | 11.13 | 114 | 12.49 | 135 | 14.31 | 141 | 14.07 |
| 80 | 50 | 107 | 3.67 | 128 | 4.27 | 149 | 4.88 | 155 | 5.06 |
| | 54 | 107 | 3.74 | 128 | 4.34 | 149 | 4.94 | 155 | 5.13 |
| | 58 | 107 | 3.79 | 128 | 4.4 | 149 | 5.02 | 155 | 5.2 |
| | 60 | 107 | 3.94 | 128 | 4.56 | 149 | 5.21 | 155 | 5.39 |
| | 64 | 107 | 4.05 | 128 | 4.71 | 149 | 5.37 | 155 | 5.56 |
| | 67 | 107 | 4.24 | 128 | 4.91 | 149 | 5.6 | 155 | 5.78 |
| | 70 | 107 | 4.33 | 128 | 5.02 | 149 | 5.73 | 155 | 5.9 |
| | 73 | 107 | 4.54 | 128 | 5.25 | 149 | 6 | 155 | 6.16 |
| | 77 | 107 | 4.76 | 128 | 5.49 | 149 | 6.26 | 155 | 6.43 |
| | 80 | 107 | 5.09 | 128 | 5.86 | 149 | 6.69 | 155 | 6.85 |
| | 84 | 107 | 5.45 | 128 | 6.27 | 149 | 7.15 | 155 | 7.31 |
| | 88 | 107 | 5.81 | 128 | 6.67 | 149 | 7.6 | 155 | 7.76 |
| | 92 | 107 | 6.21 | 128 | 7.12 | 149 | 8.09 | 155 | 8.25 |
| | 95 | 107 | 6.67 | 128 | 7.62 | 149 | 8.65 | 155 | 8.81 |
| | 99 | 107 | 7.13 | 128 | 8.12 | 149 | 9.22 | 155 | 9.37 |
| | 103 | 107 | 7.81 | 128 | 8.88 | 149 | 10.06 | 155 | 10.2 |
| | 107 | 106 | 8.91 | 126 | 10.08 | 147 | 11.39 | 155 | 11.53 |
| | 111 | 102 | 9.74 | 121 | 10.99 | 142 | 12.37 | 154 | 12.51 |
| | 115 | 98 | 10.46 | 116 | 11.76 | 135 | 13.23 | 148 | 13.34 |
| | 118 | 93 | 10.28 | 111 | 11.51 | 129 | 12.92 | 141 | 13.01 |

AIR CONDITIONER SYSTEM AND CONTROL METHOD THEREOF

CROSS-REFERENCE TO RELATED APPLICATIONS

This application is a 371 of International Application No. PCT/KR2018/011709 filed Oct. 2, 2018, which claims priority to Korean Patent Application No. 10-2017-0138153 filed Oct. 24, 2017, the disclosures of which are herein incorporated by reference in their entirety.

BACKGROUND

1. Field

Embodiments of the disclosure relate to an air conditioner system and a control method thereof.

2. Description of Related Art

Recently, air conditioning equipment for buildings has been gradually applied from a central air conditioning system, which is a typical method, to system air conditioning, which is an individual air conditioning system. Areas of application are expanding to various fields, such as retailers, residential complex buildings, schools, and small- and medium-sized buildings.

The system air conditioner may be generally composed of an outdoor unit including a compressor, an outdoor heat exchanger and other devices, and an indoor unit including an expansion device and an indoor heat exchanger. In addition, a heat pump method using a four-way valve is used to switch between heating and cooling, and a two-stage compression cycle is applied to bypass a medium-pressure gas refrigerant to the compressor at low temperature to improve its ability.

As described above, the system air conditioner to which the two-stage compression cycle capable of heating and cooling is applied is an air conditioning system capable of cooling or heating a room by using heat transfer generated in the process of compressing, condensing, expanding, and evaporating the refrigerant.

Another example of an air conditioning system is a refrigerator that uses water as a heat source, unlike the system air conditioner.

When a plurality of such system air conditioners and refrigerators are installed at a site (for example, a large building), it is necessary to be able to monitor in real time the ability of devices such as cooling and heating to control their operation.

One aspect provides an air conditioning system and a method of controlling the air conditioning system to calculate heating and cooling capacity by obtaining real-time operation data of a system air conditioner and a refrigerator, and provide an optimized operating number suitable for a site through adjustment with performance data provided by a manufacturer.

SUMMARY

In accordance with an aspect of the disclosure, an air conditioning system may include a plurality of air conditioners including a compressor, a first heat exchanger, an expansion valve, and a second heat exchanger and performing cooling and heating operations through heat exchange between a refrigerant and air; and a controller configured to control a operating number for the plurality of air conditioners according to a load for a site in which the plurality of air conditioners are installed; and the controller may correct device performance for the plurality of air conditioners using real-time operation data and device performance data for the plurality of air conditioners, and calculate the operating number for the plurality of air conditioners according to a load condition for the site by using the corrected result.

The plurality of air conditioners may include a system air conditioner and a refrigerator.

The controller may obtain the real-time data in a situation where the system air conditioner and the refrigerator are installed and operated in the site.

The device performance data may be provided by a manufacturer of the system air conditioner and the refrigerator, and may be provided in a figure file or a numerical form.

The controller may receive the device performance data and modifies it through a processing method such as image processing or mapping.

The controller may correct the device performance with respect to the plurality of air conditioners through comparison with the real-time operation data based on the formularized device performance data, and calculate the operating number of the plurality of air conditioners.

The controller may send feedback of the corrected results to the plurality of air conditioners, and recalculate the operating number of the plurality of air conditioners that meet a partial load of the installation site The plurality of air conditioners may include: at least one outdoor unit having the compressor and the first heat exchanger; and a plurality of indoor units connected to the one or more outdoor units and having the expansion valve and the second heat exchanger.

The controller may calculate the enthalpy of the refrigerant flowing in the plurality of air conditioners, calculates a refrigerant circulation amount of the refrigerant supplied to the second heat exchanger, and calculate the cooling and heating capability of the plurality of air conditioners using the enthalpy of the refrigerant and the amount of refrigerant circulation.

The controller may calculate the enthalpy of the refrigerant supplied to the second heat exchanger and the enthalpy of the refrigerant discharged from the second heat exchanger when the operation of the plurality of air conditioners is a cooling operation, and calculate the enthalpy of the refrigerant supplied to the first heat exchanger and the enthalpy of the refrigerant discharged from the first heat exchanger when the operation of the plurality of air conditioners is a heating operation.

The controller may calculate the circulation amount of the refrigerant by using a first pressure of the refrigerant discharged from the compressor, a second pressure of the refrigerant supplied to the compressor, a first temperature of the refrigerant supplied to the compressor, a second temperature of the refrigerant discharged from the compressor, a supercooling temperature, and a rotational frequency of the compressor.

In accordance with another aspect of the disclosure, a method of controlling an air conditioner system including a compressor, a first heat exchanger, an expansion valve, a second heat exchanger, a plurality of air conditioners performing heating and cooling operations through heat exchange between a refrigerant and air, the method may include: obtaining real-time operation data in a site where the plurality of air conditioners are installed; receiving and formulating device performance data provided by a manufacturer of the plurality of air conditioners; correcting device performance for the plurality of the air conditioners by comparing the formulated device performance data and the real-time operation data; and calculating the operating number for the plurality of air conditioners according to a load condition for the site by using the corrected result.

The plurality of air conditioners may include a system air conditioner and a refrigerator.

The obtaining the real-time operation data may include obtaining the real-time data in a situation where the system air conditioner and the refrigerator are installed and operated in the site.

Receiving and formulating the device performance data controller may include receiving the device performance data and formulizing it through a processing method such as image processing or mapping.

The method may further include feedback processing corrected results to the plurality of air conditioners, and recalculating the operating number of the plurality of air conditioners that meet a partial load of the installation site.

The plurality of air conditioners may include at least one outdoor unit having the compressor and the first heat exchanger; and a plurality of indoor units may be connected to the one or more outdoor units and having the expansion valve and the second heat exchanger.

The method may further include calculating the enthalpy of the refrigerant flowing in the plurality of air conditioners, calculating a refrigerant circulation amount of the refrigerant supplied to the second heat exchanger, and calculating the cooling and heating capability of the plurality of air conditioners using the enthalpy of the refrigerant and the amount of refrigerant circulation.

The method may further include determining whether the operation of the plurality of air conditioners is a cooling operation or a heating operation, and calculating the enthalpy of the refrigerant includes calculating the enthalpy of the refrigerant supplied to the second heat exchanger and the enthalpy of the refrigerant discharged from the second heat exchanger when the operation of the plurality of air conditioners is a cooling operation, and calculating the enthalpy of the refrigerant supplied to the first heat exchanger and the enthalpy of the refrigerant discharged from the first heat exchanger when the operation of the plurality of air conditioners is a heating operation.

Calculating a circulation amount of the refrigerant may include calculating the circulation amount of the refrigerant by using a first pressure of the refrigerant discharged from the compressor, a second pressure of the refrigerant supplied to the compressor, a first temperature of the refrigerant supplied to the compressor, a second temperature of the refrigerant discharged from the compressor, a super cooling temperature, and a rotational frequency of the compressor.

According to the above disclosure, by acquiring real-time operation data when a system air conditioner and a refrigerator are installed and operated in a site, calculating cooling and heating capacity and efficiency at the site using the acquired real-time operation data, correcting device performance for the site's installation environment by comparing performance data provided by a device manufacturer with the real-time operation data, determining an optimal number of operating controls suitable for the installation environment using the corrected device performance, building equipment energy can be saved.

BRIEF DESCRIPTION OF THE DRAWINGS

FIG. 8 is a diagram for explaining an example of a relationship between efficiency and cooling and heating capacity.

FIGS. 10 and 11 are views showing performance data provided by a manufacturer of an air conditioner system according to an embodiment.

DETAILED DESCRIPTION

The configuration shown in the embodiments and drawings described in this specification is a preferred example of the disclosed invention, and at the time of filing of the present application, there may be various modifications that can replace the embodiments and drawings of the present specification.

In addition, the terms used herein are used to describe the examples, and are not intended to limit the disclosed invention. Singular expressions include plural expressions unless the context clearly indicates otherwise. Also, it is to be understood that the terms "include" and "have" are intended to indicate the existence of elements disclosed in the specification, and are not intended to preclude the possibility that one or more other elements may exist or may be added.

Further, terms including an ordinal number such as "first," "second," and the like used herein may be used to describe various components, but the components are not limited by the terms, and the terms are used only for the purpose of distinguishing one component from other components. For example, a first component may be referred to as a second component without departing from the scope of the invention, and similarly, the second component may also be referred to as the first component. The term "and/or" includes a combination of a plurality of related described items or any one of a plurality of related described items.

Hereinafter, embodiments of the disclosure will be described in detail with reference to the accompanying drawings.

Figure 1:
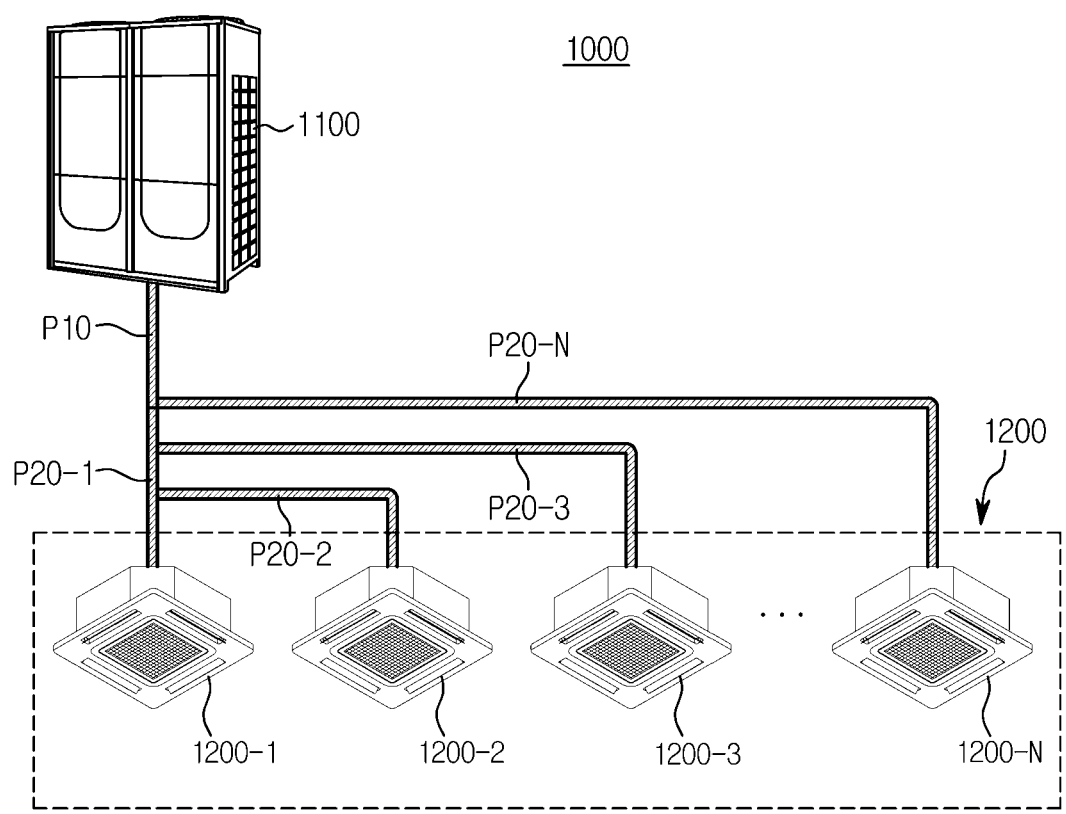
FIG. 1 is an overall configuration diagram of a system air conditioner that is an example of an air conditioner system according to an embodiment.

FIG. 1 is an overall configuration diagram of a system air conditioner that is an example of an air conditioner system according to an embodiment.

In FIG. 1, an air conditioner system 1000 includes at least one outdoor unit 1100 and at least one indoor unit 1200; 1200-1, 1200-2, 1200-3, . . . , 1200-N connected to the outdoor unit 1100 through at least one pipe p10, p20-1, p20-2, p20-3, . . . p20-N (hereinafter, N is a natural number of 1 or more).

The outdoor unit 1100 is usually installed in an outdoor space, and the at least one indoor unit 1200; 1200-1, 1200-2, 1200-3, . . . 1200-N is installed in at least one indoor space to control air. In this case, the at least one indoor unit 1200; 1200-1, 1200-2, 1200-3, . . . 1200-N may be installed in the one indoor space, or a plurality of the indoor units 1200: 1200-1, 1200-2, 1200-3, . . . 1200-N may be installed in the one indoor space.

The air conditioner system 1000 provides cool air (hereinafter, referred to as 'cooling operation') or warm air (hereinafter, referred to as 'heating operation') to each of the indoor spaces corresponding to each of the indoor units by using a refrigerant flowing between the plurality of indoor units and the outdoor unit 1100 through the at least one pipe.

The outdoor unit 1100 is provided in the outdoor space to perform heat exchange between outdoor air and the refrigerant. The outdoor unit 1100 may perform a cooling operation or a heating operation based on at least one of a predefined setting and a user's selection.

As the indoor unit 1200 provides cold or warm air to the corresponding indoor space, the air temperature of the indoor space is corrected. Here, the cooling operation and the heating operation may be selectively performed according to the predefined settings or the user's selection.

The refrigerant may be introduced into the plurality of indoor units 1200, or may be selectively introduced into only some of the indoor units among the plurality of indoor units 1200. Accordingly, the air conditioner system 1000 may control the air in all the indoor spaces in which the plurality of indoor units 1200 are installed, or may control only the air in some of the indoor spaces.

The refrigerant commonly used in the air conditioner system 1000 is mainly a refrigerant of the Chlorofluorocarbon (CFC) series, which is widely known as Freon gas.

However, the use of CFC-based refrigerants has been completely banned worldwide since CFC-based refrigerants have been identified as a major cause of the collapse of the stratospheric ozone layer, therefore as an alternative refrigerant, a refrigerant of Hydrochlorofluorocarbon (HCFC) was used.

Recently, the standard for the regulation of refrigerant use has been changed from the Ozone Depletion Potential (ODP) to the Global Warming Potential (GWP). Refrigerants are being converted into refrigerants that replace the HCFC-based refrigerant, which is designated as a cause of global warming, and refrigerants that are based on Hydrofluorocarbon (HFC).

Currently, the most commonly used refrigerant in the air conditioner system 1000 is the HFC-based R410A refrigerant, and the same HFC-based R32 refrigerant has a low GWP value and is gradually being applied as an alternative refrigerant.

Figure 2:
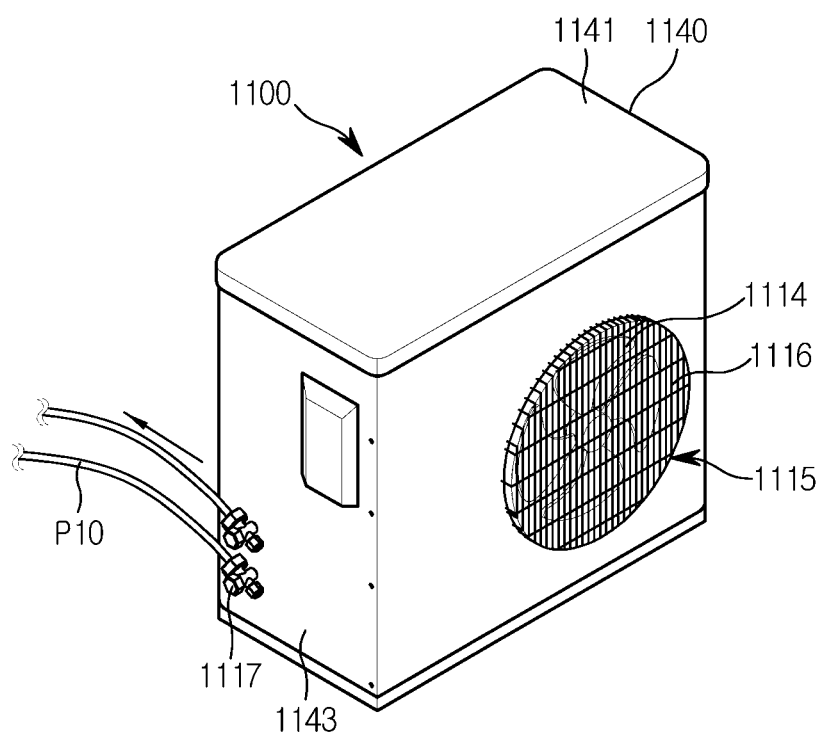
FIG. 2 is a perspective view showing an outdoor unit of an air conditioner system according to an embodiment.
Figure 3:
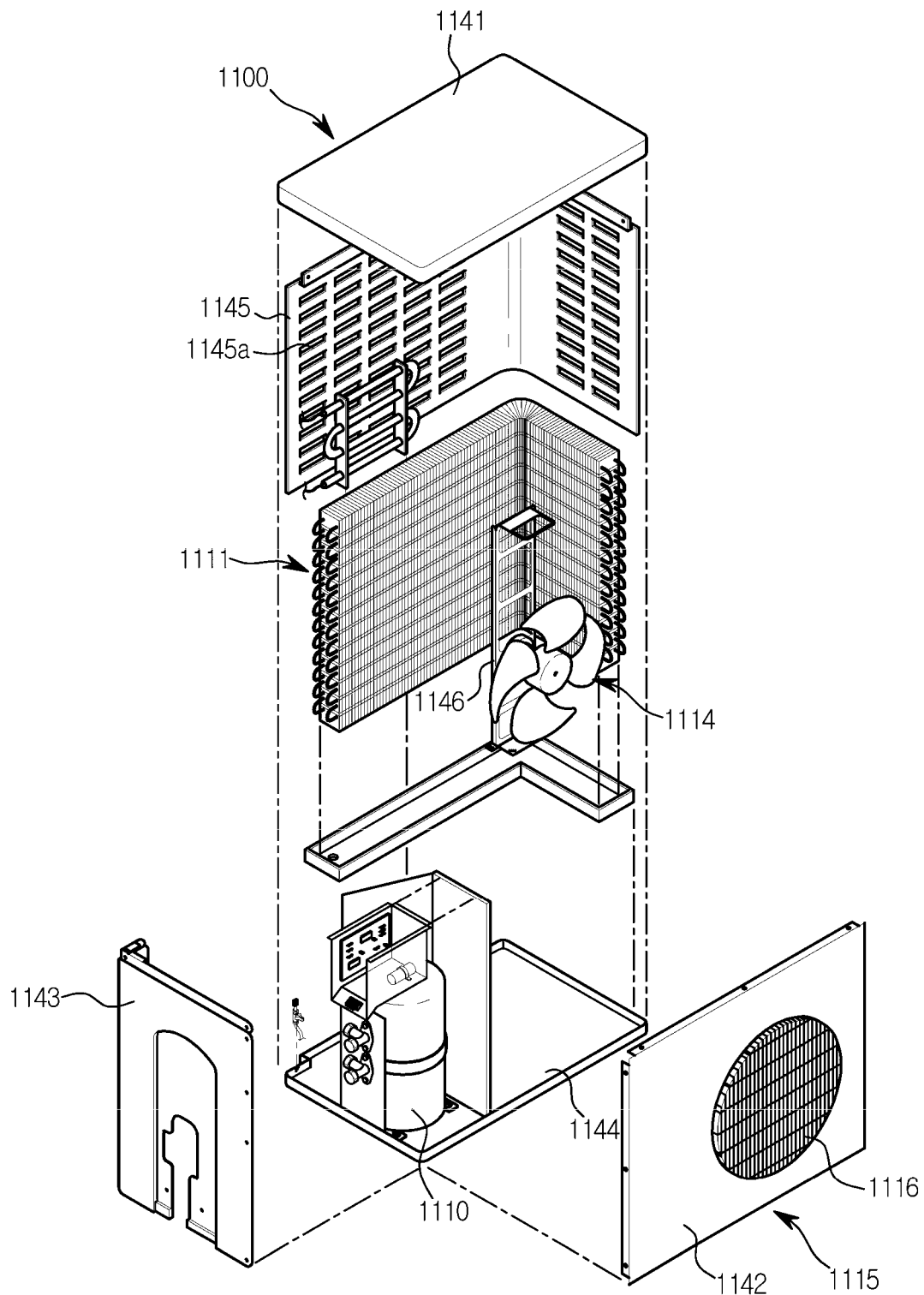
FIG. 3 is an exploded perspective view of FIG. 2.
Figure 4:
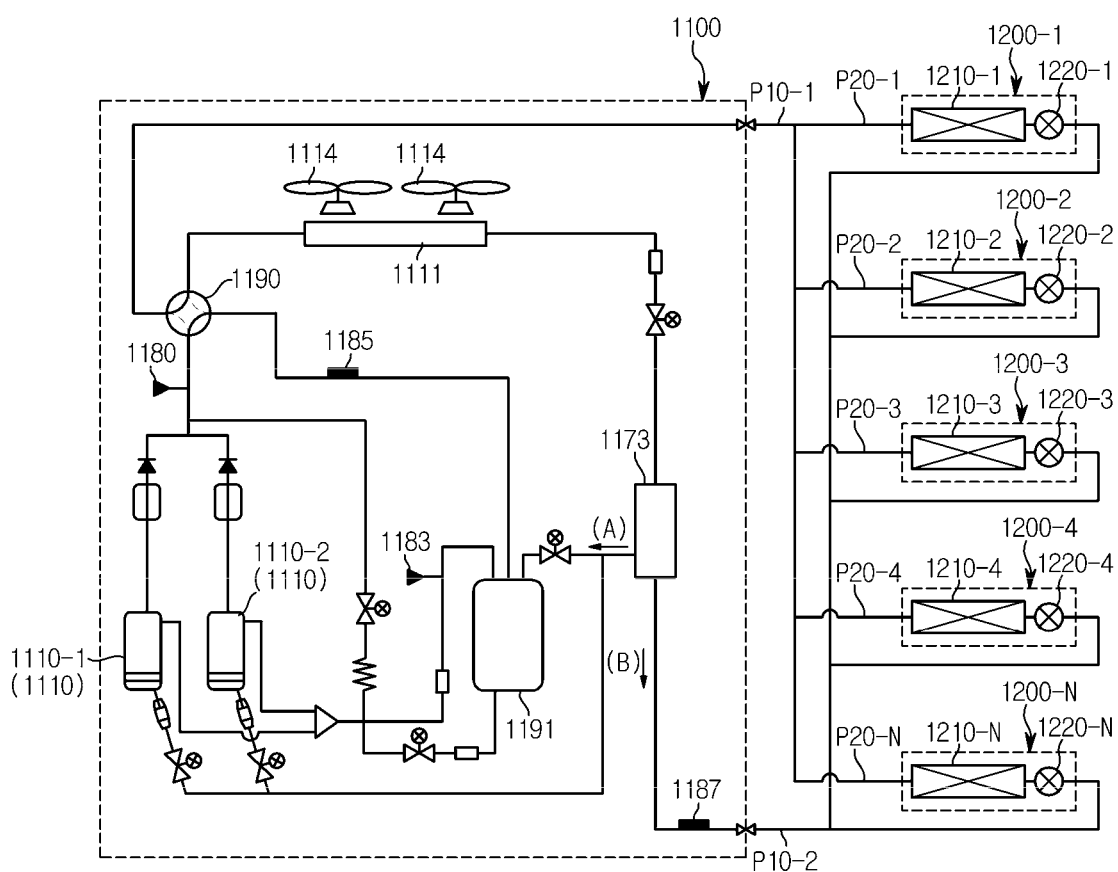
FIG. 4 is a configuration diagram of a two-stage compression cycle of an air conditioner system according to an embodiment.

FIG. 2 is a perspective view showing an outdoor unit of an air conditioner system according to an embodiment. FIG. 3 is an exploded perspective view of FIG. 2. FIG. 4 is a configuration diagram of a two-stage compression cycle of an air conditioner system according to an embodiment.

As shown in FIGS. 2 and 3, the outdoor unit 1100 includes at least one compressor 1110 that increases the pressure of the refrigerant by compressing the supplied refrigerant, a first heat exchanger 1111 for condensing or evaporating the refrigerant by exchanging heat with external air, an outdoor unit fan 1114 that discharges heat or cold air generated from a second heat exchanger 1210; 1210-1, 1210-2, . . . , 1210-N to the outside, a refrigerant flow path (not shown) that guides the refrigerant flow between the compressor 1110, the first heat exchanger 1111, and other components, and an external housing 1140 containing various components such as a refrigerant passage, the compressor 1110, the first heat exchanger 1111, and the outdoor unit fan 1114.

The external housing 1140 may include a top housing 1141, a front housing 1142, a side housing 1143, a bottom housing 1144, and a back housing 1145. Each of the housings 1141 to 1145 are combined with each other to form an exterior of the outdoor unit 1100, and it is provided to be disposed on various parts of the outdoor unit 1100 on the inside. Depending on the embodiment, at least two or more of the top housing 1141, the front housing 1142, the side housing 1143, the bottom housing 1144, and the back housing 1145 may be integrally formed.

The front housing 1142 is provided with a blower 1115 through which air inside the external housing 1140 is discharged to the outside, and the outdoor unit fan 1114 may be exposed to the outside through the blower 1115. If necessary, a blocking screen 1116 for preventing external direct contact with the outdoor unit fan 1114 may be provided on the front surface of the blower 1115.

The side housing 1143 may be formed with a piping connecting member 1147 to which an external pipe P10 can be installed, and the piping connecting member 1147 is provided to be connected to a refrigerant passage provided inside the external housing 1140.

The back housing 1145 may be formed with a suction port 1145a to allow outdoor air to flow into a space formed inside the external housing 1140, and the outdoor air introduced into the suction port 1145a may be discharged to the outside again through the blower 1115 after being contaminated with heat or cold air emitted from the first heat exchanger 1111.

The outdoor unit fan 1114 may be installed on an outdoor unit fan support member 1146 so as to face the direction of a blower port 1155, and may be rotated in a predetermined direction in combination with a motor. The motor is provided so that a drive shaft is connected to a rotation axis of the outdoor unit fan 1114 in a straight line or by using at least one gear device so as to rotate the outdoor unit fan 1114. The outdoor unit fan 1114 rotates according to the rotational speed of the drive shaft of the motor. The motor may be provided with a variable rotational speed of the drive shaft.

The compressor 1110 may suck the supplied refrigerant, compress the sucked low-temperature low-pressure refrigerant, and change it into a high-temperature high-pressure gas, and discharge it. The compressor 1110 is connected to the refrigerant passage connected to the external pipe P10 and the first heat exchanger 1111 through at least one refrigerant passage. The compressor 1110 may be configured as an inverter compressor having a variable compression capacity depending on an input frequency. It may be composed of a combination of a plurality of constant speed compressors having a constant compression capacity. In addition, various types of compressors that can be considered by those skilled in the art may be used.

Figure 6:
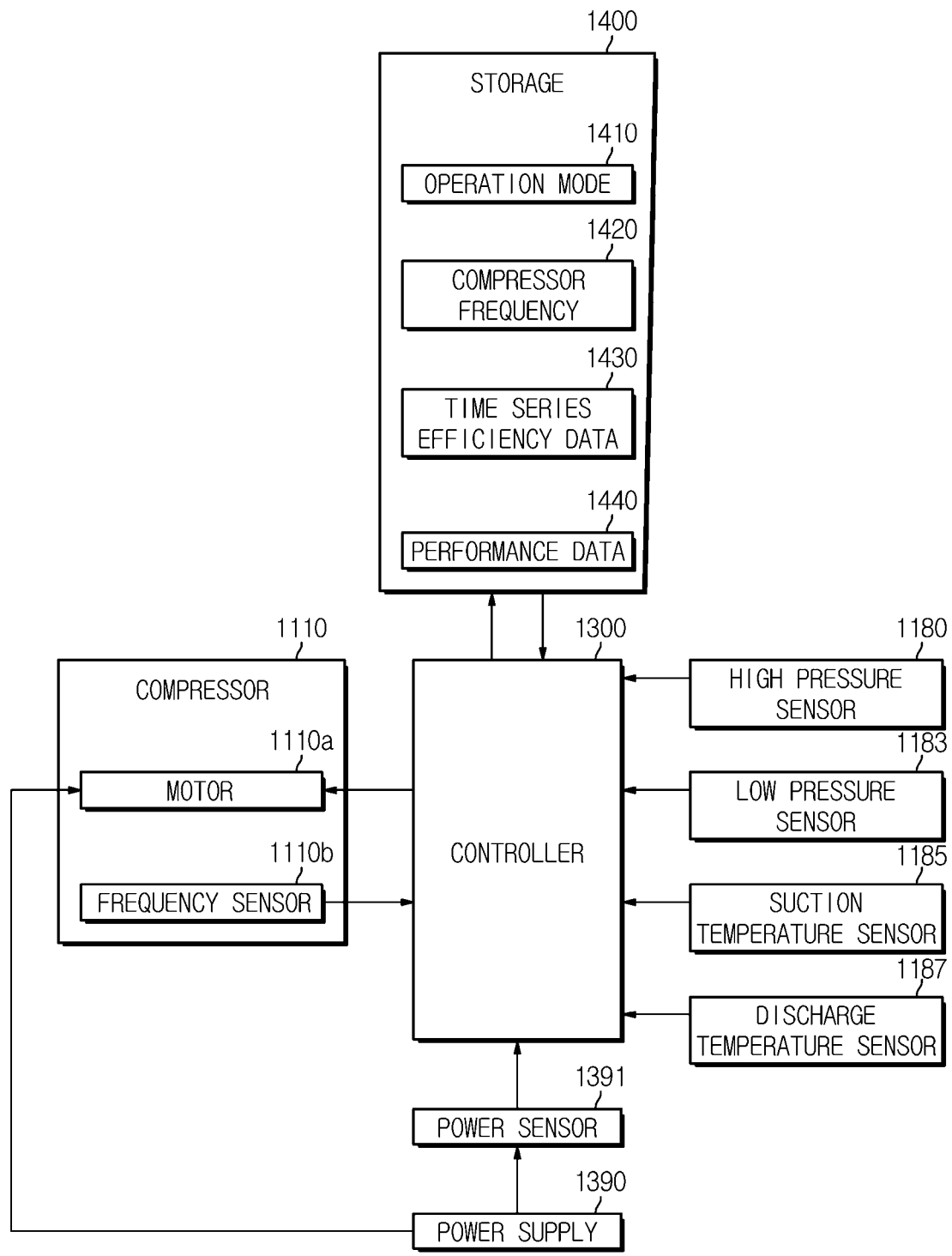
FIG. 6 is a control system diagram of an air conditioner system according to an embodiment.

The compressor 1110 may include a predetermined motor to convert the refrigerant into a high temperature and high pressure gas. The motor may rotate at a predetermined frequency (hereinafter, referred to as 'compressor frequency') under the control of a controller 1300 (FIG. 6). The cooling capacity of the air conditioner system 1000 can be determined according to the compressor frequency.

If the inverter compressor is used as the compressor 1110, the compressor frequency can be changed. The change in the compressor frequency may be determined according to a control signal transmitted from the controller 1300. In this case, the controller 1300 may further store the compressor frequency included in the control signal transmitted to the motor of the compressor 1110 in a storage 1400.

According to an embodiment, as shown in FIG. 4, the outdoor unit 1100 may include a plurality of the compressors 1110; 1110-1, 1110-2. In this case, the outdoor unit 1100 may further include a distributor that distributes the refrigerant to each of the plurality of compressors 1110; 1110-1, 1110-2.

The outdoor unit 1100 may further include a bypass module 1173 that bypasses the refrigerant discharged from the first heat exchanger 1111 to at least one of the compressors 1110; 1110-1, 1110-2.

After being compressed by at least one of the compressors 1110; 1110-1, 1110-2, the discharged refrigerant flows into the first heat exchanger 1111, and the refrigerant discharged from the first heat exchanger 1111 moves in the direction of at least one of the compressors 1110; 1110-1, 1110-2 by the bypass module 1173 in a first stage (direction A), and the at least one compressor 1110; 1110-1, 1110-2 is compressed again and then discharged. The discharged refrigerant flows back into the first heat exchanger 1111 and the refrigerant discharged from the first heat exchanger 1111 moves in the direction of the indoor unit 1200 by the bypass module 1173 in a second stage (direction B). Therefore, the refrigerant can be compressed in two stages by at least one of the compressors 1110; 1110-1, 1110-2.

According to one embodiment, the refrigerant discharged from the compressor 1110; 1110-1, 1110-2 may be delivered to a four-way valve 1190. The refrigerant may be delivered to the first heat exchanger 1111 or to a first pipe p10-1 depending on the operating state of the four-way valve 1190.

The four-way valve 1190 is a valve provided to determine the direction of movement of the refrigerant flowing in the air conditioner system 1000 by connecting any two of four outlets to each other and simultaneously connecting the other two outlets to each other. The four-way valve 1190 may allow the air conditioner system 1000 to perform a heating operation or a cooling operation according to an operation state. Specifically, when the four-way valve 1190 guides the refrigerant discharged from the compressor 1110 toward the first heat exchanger 1111, the air conditioner system 1000 performs a cooling operation, and when the four-way valve 1190 guides the refrigerant discharged from the compressor 1110 in the direction of the first pipe p10-1, the air conditioner system 1000 performs a heating operation.

The four-way valve 1190 may change the direction of movement of the refrigerant under the control of the controller 1300. In this case, information on the operating state of the four-way valve 1190, that is, the operation mode of the air conditioner system 1000, can be stored in the storage 1400, as shown in FIG. 6, at the same time as the control signal of the controller 1300 is generated. The controller 1300 then reads the operation mode of the storage 1400 to recognize whether the air conditioner system 1000 performs a heating operation or a cooling operation.

The first heat exchanger 1111 performs a function of a condenser when the air conditioner system 1000 performs a cooling operation, and may liquefy a high-temperature, high-pressure gaseous refrigerant into a high-temperature high-pressure liquid. In this case, the refrigerant in the first heat exchanger 1111 releases heat while liquefying, thereby decreasing the temperature of the refrigerant. In addition, the first heat exchanger 1111 may perform the function of an evaporator when the air conditioner system 1000 is heated. In this case, the refrigerant absorbs the surrounding heat while evaporating around the first heat exchanger 1111, and accordingly, the temperature of the refrigerant may increase.

The first heat exchanger 1111 may be implemented using a cooling tube formed to be bent in a predetermined shape, for example, a zigzag shape. In this case, one end of the cooling pipe may be connected to a refrigerant passage connected to the compressor 1110. The other end may be connected to a refrigerant passage connected to an electronic expansion valve 1220; 1220-1, 1220-2, . . . , 1220-N of the indoor unit 1200 (as shown in FIG. 4), or may be connected to the external pipe P10; P10-1, P10-2 according to a designer's design.

The first heat exchanger 1111 may include various types of heat exchangers such as a water-cooled condenser, an evaporative condenser, or an air-cooled condenser. In addition to these, various types of condensers that the designer can consider can be used.

The refrigerant flow path may interconnect the compressor 1110 installed inside the outdoor unit 1100, the first heat exchanger 1111, and the external pipe P10; P10-1, P10-2. For example, the four-way valve 1190, the expansion valve 1220; 1220-1, 1220-2, . . . , 1220-N, etc., may be connected. The external pipe P10; P10-1, P10-2 is connected to the indoor unit 1200.

If necessary, the outdoor unit 1100 may further include an accumulator 1191 for preventing a liquid refrigerant from flowing into the compressor 1110 as illustrated in FIG. 4. The accumulator 1191 may provide a gaseous refrigerant to the compressor 1110 after separating the liquid refrigerant that has not evaporated from the vaporized refrigerant.

Although an example of the outdoor unit 1100 has been described above, the physical structure of the outdoor unit 1100 is not limited to the above, and may vary according to an installation location, the number of the connected indoor units 1200, and the designer's intention or taste.

The indoor unit 1200 is installed in each of the indoor spaces, and is provided to control the indoor temperature by discharging cold or warm air to the indoor space.

The indoor unit 1200 may be considered by the designer and may have any shape, such as a wall-mounted indoor unit mounted on a wall, a stand-type indoor unit mounted on one location in an indoor space, a window-type indoor unit installed on a window, or a ceiling-mounted indoor unit installed on a ceiling according to an embodiment.

The indoor unit 1200 connected to the outdoor unit 1100 may all have the same shape, may have different shapes from each other, some may have the same shape, and some may have different shapes. For example, all the indoor units 1200 may be ceiling-mounted indoor units. Alternatively, some of the indoor units 1200 are ceiling-mounted indoor units and others are stand-type indoor units. Another part may be a wall-mounted indoor unit.

The indoor unit 1200 may include the second heat exchanger 1210; 1210-1, 1210-2, 1210-3, . . . 1210-N, as shown in FIG. 3, and may further include the expansion valve 1220; 1220-1, 1220-2, . . . , 1220-N according to an embodiment.

The second heat exchanger 1210 is provided to discharge cold air or warm air. Specifically, in the case of a cooling operation, while passing through the second heat exchanger 1210, the refrigerant absorbs latent heat of the air inside the indoor unit 1200 and evaporates to lower the temperature of the air inside the indoor unit 1200. Accordingly, the second heat exchanger 1210 can generate cold air. The generated cold air can be discharged into the indoor space through a fan provided in the indoor unit 1200. Conversely, in the case of a heating operation, the refrigerant in the form of a high temperature and high pressure gas that passes through the second heat exchanger 1210 is liquefied into a high temperature and high pressure liquid, and thus heat is discharged to the outside. Therefore, the second heat exchanger 1210 can generate warmth, and the generated heat can be discharged to the indoor space through the fan.

The second heat exchanger 1210 may include a flow path through which the refrigerant flows, and the flow path may be implemented using a tube formed of a metal or a synthetic resin material. The tube may be bent multiple times to have a zigzag shape.

The expansion valve 1220; 1220-1, 1220-2, . . . , 1220-N may expand the condensed refrigerant. The expansion valve 1220; 1220-1, 1220-2, . . . , 1220-N may include, for example, an electromagnetic expansion valve. The expansion valve 1220; 1220-1, 1220-2, . . . , 1220-N may be installed in the outdoor unit 1100, may be installed in the indoor unit 1200, or may be installed in a predetermined position of a pipe connecting the outdoor unit 1100 and the indoor unit 1200.

Hereinafter, the relationship between the pressure and the enthalpy when performing two-stage compression will be described with reference to FIG. 5.

Figure 5:
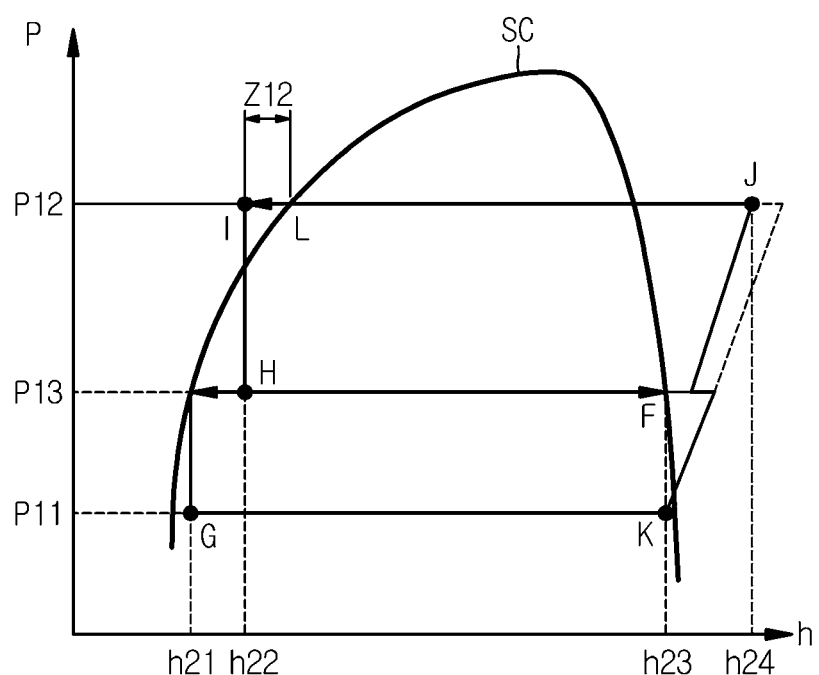
FIG. 5 is a diagram showing a p-h graph during two-stage compression.

FIG. 5 is a diagram showing a p-h graph during two-stage compression. An x-axis refers to enthalpy, and a y-axis refers to pressure.

In FIG. 5, when the air conditioner system 1000 performs a cooling operation, the high-temperature and high-pressure refrigerant compressed by the compressor 1110; 1110-1, 1110-2 is delivered to the first heat exchanger 1111 via a refrigerant passage and the four-way valve 1190. The refrigerant discharged from the first heat exchanger 1111 returns to the compressor 1110; 1110-1, 1110-2 through the expansion valve 1220; 1220-1, 1220-2, . . . , 1220-N and the second heat exchanger 1210; 1210-1, 1210-2, . . . , 1210-N through the refrigerant passage.

When performing two-stage compression in the compressor 1110; 1110-1, 1110-2, the pressure rises from a first pressure P11 to a second pressure P12 through a third pressure P13 (K-J section). The enthalpy decreases from a fourth enthalpy h24 to a second enthalpy h22 (section J-1) in the first heat exchanger 1111. In the expansion valve 1220; 1220-1, 1220-2, . . . , 1220-N, the pressure decreases to the first pressure P11, and the enthalpy also decreases to a first enthalpy h21 (I-G section). In the second heat exchanger 1210; 1210-1, 1210-2, . . . , 1210-N, the enthalpy rises from the first enthalpy h21 to a third enthalpy h23 (G-K section).

Accordingly, in the case of two-stage compression, a relationship between the pressure and the enthalpy in a cooling cycle forms a shape in which two squares are disposed adjacent to each other. When the air conditioner system 1000 performs a heating operation, a change in pressure and enthalpy occurs in a direction opposite to that described above.

A saturation curve SC changes depending on the indoor air temperature and the outdoor air temperature, and has a shape of a convex curve upward in accordance with a pressure P and an enthalpy h, as shown in FIG. 5. The saturation curve SC meets a straight line representing a change in the pressure P and the enthalpy h of the refrigerant in the first heat exchanger 1111 at one point, that is, an L point. Here, a section Z12 between an I point and the L point means a supercooled section. Accordingly, a supercooling temperature TI may be measured using the size of the section Z12 between the I point and the L point, that is, the enthalpy difference.

FIG. 6 is a control system diagram of an air conditioner system according to an embodiment.

In FIG. 6, the air conditioner system 1000 may include the controller 1300 that controls the overall operation of the air conditioner system 1000, the storage 1400 for storing various information necessary for at least one of the air conditioner system 1000 and the controller 1300, and a power supply 1390 for supplying power to a motor 1110a of the compressor 1110; 1110-1, 1110-2, and at least one sensor 1110b, 1180, 1183, 1185, 1187, 1391 capable of transmitting data corresponding to the measurement result to the controller 1300 in the form of an electrical signal.

The controller 1300 may be implemented using a device capable of performing various calculation and control operations. For example, it may be implemented using a central processing unit (CPU), a microcomputer unit (MiCOM), or a micro control unit (MCU). The controller 1300 may be implemented using one or a plurality of semiconductor chips or devices including the same.

According to an embodiment, the controller 1300 may be implemented using a general-purpose processing device. In this case, the controller 1300 may drive a program stored in the storage 1400 to perform necessary operations and control operations. The program stored in storage 1400 may be stored by the designer, or may be provided from an external server device connectable using a separate communication network. For example, the program may be provided through an electronic software distribution network. Further, the controller 1300 may be implemented using a processing device programmed in advance by the designer to perform a specific operation.

The controller 1300 may calculate and obtain air conditioning capacity and efficiency corresponding to the air conditioning capacity based on various information transmitted from at least one of the sensors 1110b, 1180, 1183, 1185, 1187, 1391. This will be described later.

In addition, the controller 1300 is based on device performance data provided by a manufacturer of the air conditioner system 1000, and corrects the device performance through comparison with real-time operation data. The operating number can be determined automatically. This will be described later.

The storage 1400 may be implemented using a magnetic disk storage medium, a magnetic drum storage medium, or a semiconductor storage medium. Here, the semiconductor storage medium may include, for example, a volatile memory such as static random access memory (S-RAM), dynamic random access memory (D-RAM), or read-only memory (ROM), or IP, and a non-volatile memory, such as erasable programmable read only memory (EPROM), electrically erasable programmable read only memory (EEPROM), and flash memory.

The storage 1400 is provided to store at least one of information about an operation mode 1410, information about a compressor frequency 1420, time series efficiency data 1430, and device performance data 1440 according to an embodiment.

Information about the operation mode 1410 may include information about the current operating state of the air conditioner system 1000. For example, the information about the operation mode 1410 includes any of information indicating whether the air conditioner system 1000 is currently performing a cooling operation or information indicating whether the air conditioner system 1000 is currently performing a heating operation. The controller 1300 can recognize whether the air conditioner system 1000 performs a cooling operation or a heating operation based on the information about the operation mode 1410.

The information about the compressor frequency 1420 may include information about the frequency at which the motor 1110a of the compressor 1110 operates. The controller 1300 reads the information about the compressor frequency 1420 as necessary to recognize the frequency of the compressor 1110. If the frequency sensor 1110b is provided in the compressor 1110, the information about the compressor frequency 1420 may not be stored in the storage 1400.

The time series efficiency data 1430 may consist of a set of calculation results for at least one of air conditioning capability (cooling and heating capability) and efficiency. At least one of heating and cooling capability and efficiency may be obtained by the controller 1300. The controller 1300 may acquire at least one of heating and cooling capabilities and efficiencies corresponding to a plurality of viewpoints at the plurality of viewpoints, the time series efficiency data 1430 may be formed of a set of calculation results for at least one of the heating and cooling capability and efficiency at a plurality of time points according to the acquisition result of the controller 1300. The time series efficiency data 1430 may be obtained periodically, or may be acquired at any time point defined by the controller 1300. Here, the periodic meaning may include a relatively short period, such as 1 second or 2 seconds, or a relatively long period, such as 1 day, 1 month, or 1 year.

The device performance data 1440 may include information on performance data of the air conditioner system 1000. For example, the device performance data 1440 may include performance data (efficiency change for each load/external/coolant condition) provided by a manufacturer such as a system air conditioner or a refrigerator constituting the air conditioner system 1000. The controller 1300 can correct the performance of the air conditioner system 1000 based on the device performance data 1440. The device performance data 1440 may be input in a picture file or a numeric form, may be periodically input, or may be input at any time point defined by the controller 1300.

The power supply 1390 may supply power required for operation to the motor 1110a, and may supply power required for various parts of the air conditioner system 1000, for example, the controller 1300, in addition to the motor 1110a. The power or amount of power supplied from the power supply 1390 may be sensed by the power sensor 1139.

The frequency sensor 1110b is provided to measure the rotational frequency of the motor 1110a of the compressor 1110, that is, the compressor frequency. The frequency sensor 1110b may be implemented using various sensors, for example, an encoder, etc., which are typically used to detect the rotational frequency of the motor 1110a. When the storage 1400 stores the compressor frequency 1420, the frequency sensor 1110b may be omitted.

The high pressure sensor 1180 is provided to measure a first pressure p11 (which can also be referred to as high pressure) of the refrigerant discharged from the compressor 1110 and transmit the measurement result to the controller 1300. As shown in FIG. 4, the high pressure sensor 1180 may be installed adjacent to the discharge port of the compressor 1110, for example, may be installed between the compressor 1110 and the first heat exchanger 1111. According to an embodiment, the high pressure sensor 1180 may be installed between the compressor 1110 and the four-way valve 1190. The high pressure sensor 1180 may be implemented using a piezo-resistive pressure sensor, a capacitive pressure sensor, and/or a piezo-electric effect pressure sensor. In addition, it can be implemented by employing various types of pressure sensors that the designer can consider.

The low pressure sensor 1183 measures a second pressure p12 (which can also be referred to as low pressure) of the refrigerant supplied to the compressor 1110, and transmits the measurement result to the controller 1300 through a wire, circuit, or wireless communication network. As shown in FIG. 4, the low pressure sensor 1183 may be installed adjacent to a refrigerant inlet of the compressor 1110, for example, may be installed between the compressor 1110 and the accumulator 1191. In addition, the low pressure sensor 1183 may be installed between the compressor 1110 and the second heat exchanger 1210; 1210-1, 1210-2, ..., 1210-N. The low pressure sensor 1183 may be implemented using a piezoelectric resistance type pressure sensor, a capacitive pressure sensor, and/or a piezo-electric effect type pressure sensor, similar to the high pressure sensor 1180. In addition, it may be implemented using various types of pressure sensors that the designer may consider.

The suction temperature sensor 1185 is provided to measure a first temperature of the refrigerant supplied to the compressor 1110. The suction temperature sensor 1185 may be installed adjacent to the refrigerant inlet of the compressor 1110, and may be installed between the four-way valve 1130 and the accumulator 1191, for example, as illustrated in FIG. 4. In addition, it is possible to install the suction temperature sensor 1185 in various positions that the designer can consider. The suction temperature sensor 1185 may be implemented using various sensors capable of measuring the temperature of the refrigerant, for example, a bimetal thermometer, a thermistor thermometer, or an infrared thermometer.

The discharge temperature sensor 1187 is provided to measure a second temperature of the refrigerant discharged from the compressor 1110. The discharge temperature sensor 1187 may be installed adjacent to a refrigerant outlet of the compressor 1110, for example, as shown in FIG. 4, between the bypass module 1173 and the indoor unit 1200, for example the expansion valve 1220; 1220-1, 1220-2, ..., 1220-N. In addition, the discharge temperature sensor 1187 may be installed at various positions that the designer can consider. The discharge temperature sensor 1187 may be implemented using various sensors capable of measuring the temperature of the refrigerant, such as a bimetal thermometer, thermistor thermometer, or infrared thermometer, similar to the suction temperature sensor 1185.

The power sensor 1391 is provided to measure voltage, current, power, or power amount supplied from the power supply 1390, and can be implemented using a voltmeter, ammeter, power meter, and/or power meter. The measurement result of the power sensor 1391 is transmitted to the controller 1300, and the controller 1300 may calculate efficiency based on the measurement result delivered as needed. The power sensor 1391 may be omitted depending on the embodiment.

Hereinafter, a detailed operation of the controller 1300 for calculating the heating and cooling capacity of the air conditioner system 1000 will be described with reference to FIG. 7.

Figure 7:
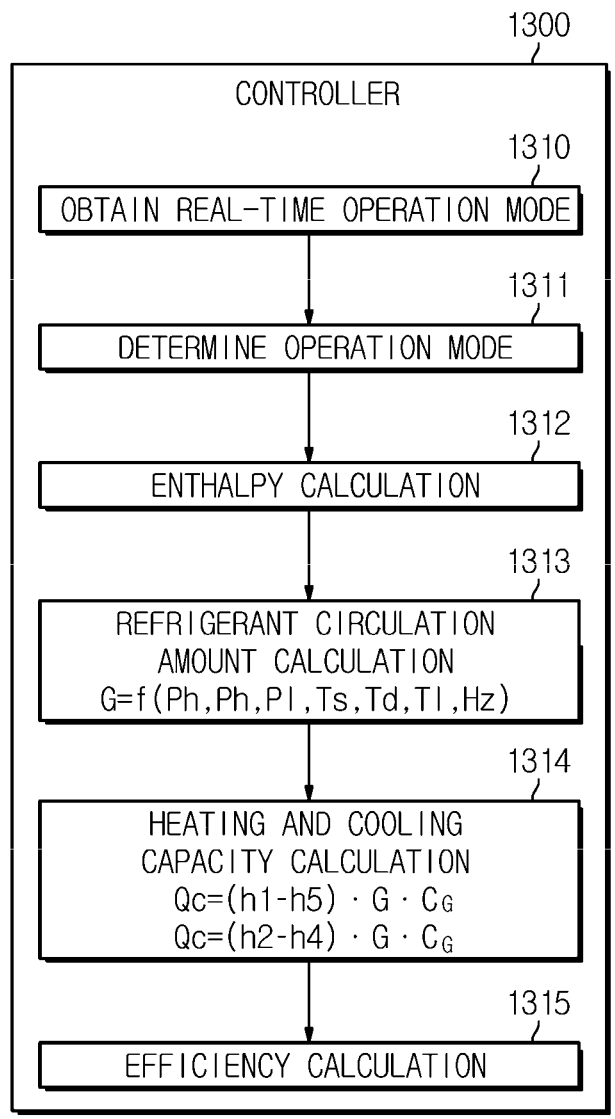
FIG. 7 is a detailed configuration diagram of a controller for calculating cooling and heating capabilities of an air conditioner system according to an embodiment.

FIG. 7 is a detailed configuration diagram of a controller for calculating cooling and heating capabilities of an air conditioner system according to an embodiment.

In FIG. 7, the controller 1300 may first receive operation data necessary for generating calculation and control signals in real time from at least one of the sensors 1110*b*, 1180, 1183, 1185, 1187, 1391 (1310). In this case, the controller 1300 may receive necessary real-time operation data only from a specific sensor, for example, the high pressure sensor 1180, the low pressure sensor 1183, the suction temperature sensor 1185, and the discharge temperature sensor 1187. In addition, the controller 1300 may read the storage 1400 to obtain the necessary real-time operation data. For example, the controller 1300 may receive the information about the operation mode 1410 or the information about the compressor frequency 1420 from the storage 1400.

According to an embodiment, when the compressor frequency is 0 or smaller than a predefined reference value, the controller 1300 may be set not to perform an operation after a data acquisition 1310 to prevent unnecessary calculation and control.

In addition, according to an embodiment, when the controller 1300 does not exceed a first reference pressure from the first pressure transmitted from the high pressure sensor 1180, and/or the second pressure transmitted from the low pressure sensor 1183 does not exceed a predefined second reference pressure, in order to prevent unnecessary calculation and control, it may be set not to perform an operation after the data acquisition 1310. Here, at least one of the first reference pressure and the second reference pressure may be arbitrarily defined by the designer. According to an embodiment, the first reference pressure and the second reference pressure may be defined based on the pressure determined that the air conditioner system 1000 is not substantially operating.

The controller 1300 reads the information about the operation mode 1410 or uses a different method, for example, an air temperature sensor installed inside the indoor unit 1200 to determine whether the air conditioner system 1000 performs a heating operation or a cooling operation (1311).

When it is determined whether the air conditioner system 1000 performs the heating operation or the cooling operation, the controller 1300 may calculate a predetermined enthalpy according to whether the heating operation or the cooling operation is performed (1312).

For example, when the air conditioner system 1000 performs a heating operation, the controller 1300 may calculate the enthalpy of entry and exit of the first heat exchanger 1111. Specifically, as illustrated in FIG. 5, the enthalpy at the high pressure P12, that is, the second enthalpy h22 and the fourth enthalpy h24 may be calculated. In this case, the controller 1300 may use a predefined equation for enthalpy for calculation of the enthalpies h21, h23, h24, or may refer to a table obtained based on prior experience or experiment.

For another example, when the cooling operation is performed, the controller 1300 may acquire the enthalpy of entry and exit of the second heat exchangers 1210; 1210-1, 1210-2, . . . , 1210-N. For example, in the case of the cooling operation, the controller 1300 may calculate the enthalpy at the first pressure P11, that is, the first enthalpy h21 and the third enthalpy h23 as shown in FIG. 5. As described above, the enthalpies h21, h23 may be obtained based on a predefined equation, or may be performed by referring to a table separately provided.

The amount of refrigerant circulation 1313 may be calculated simultaneously or sequentially with the calculation of enthalpy 1312. The calculation of the refrigerant circulation amount (1313) may be performed prior to the calculation of enthalpy (1312).

According to one embodiment, the controller 1300 may calculate the amount of refrigerant circulation by combining the first pressure transmitted from the high pressure sensor 1180, a second pressure transmitted from the low pressure sensor 1183, the first temperature transmitted from the suction temperature sensor 1185, the second temperature transmitted from the discharge temperature sensor 1187, the supercooling temperature calculated separately, and a compressor rotation frequency delivered from the frequency sensor 1110*b* or obtained from the storage 1400.

According to an embodiment, the controller 1300 may be designed to calculate the refrigerant circulation amount based on the following [Equation 1].

$$G = f(Ph, Pl, Ts, Td, Tl, Mf)  \quad \text{[Equation 1]}$$

Here, G means the refrigerant circulation amount, Ph means the first pressure, Pl means the second pressure, Ts means the first temperature, Td means the second temperature, Tl means the supercooling temperature, and Mf means the compressor frequency.

In other words, the refrigerant circulation amount G may be given as a function with the first pressure Ph, the second pressure Pl, the first temperature Ts, the second temperature Td, the supercooling temperature Tl and the compressor frequency Mf.

In this case, [Equation 1] may be given, for example, in the form of [Equation 2] below.

$$G = c_1 \cdot Ph^2 + c_2 \cdot Pl^2 + c_3 \cdot Ts^2 + c_4 \cdot Td^2 + c_5 \cdot Tl^2 + c_6 \cdot Mf^2) \quad \text{[Equation 2]}$$

In the same manner as described above, in [Equation 2], G means the refrigerant circulation amount, Ph means the first pressure, Pl means the second pressure, Ts means the first temperature, Td means the second temperature, Tl means the supercooling temperature, and Mf means the compressor frequency. $c_1$ to $c_6$ are constants added to each of the first pressure Ph, the second pressure Pl, the first temperature Ts, the second temperature Td, the supercooling temperature Tl, and the compressor frequency Mf, and may be defined through mathematical operations, or experimentally and empirically.

As described in [Equation 2], the refrigerant circulation amount G may be determined as the sum of the square of the first pressure Ph, the square of the second pressure Pl, the square of the first temperature Ts and the second temperature Td, the square of the supercooling temperature Tl, and the square of the compressor frequency Mf. In other words, the refrigerant circulation amount G can be given in the form of a quadratic function to each of the first pressure Ph, the second pressure Pl, the first temperature Ts, the second temperature Td, the supercooling temperature Tl and the compressor frequency Mf, respectively.

Accordingly, the refrigerant circulation amount G will increase more quickly than an increase rate of the first pressure Ph, the second pressure Pl, the first temperature Ts, the second temperature Td, the supercooling temperature Tl, or the compressor frequency Mf.

[Equation 1] and [Equation 2] described above may be calculated through separate mathematical operations, or may be obtained empirically. When obtained empirically, it may be calculated by performing a regression analysis using the refrigerant circulation amount G as a dependent variable, and the first pressure Ph, the second pressure Pl, the first temperature Ts, the second temperature Td, and the supercooling temperature Tl as independent variables.

When the refrigerant circulation amount G is calculated, the controller 1300 may calculate the cooling and heating capacity of the air conditioner system 1000 using the refrigerant circulation amount G and the enthalpy (1314).

When the refrigerant circulation amount G is calculated, the controller 1300 may calculate the cooling and heating capacity of the air conditioner system 1000 using the refrigerant circulation amount G and the enthalpy (1314).

According to an embodiment, when the air conditioner system 1000 performs the cooling operation, the controller 1300 may obtain and calculate the air conditioning capacity using [Equation 3] below.

$$Q_c = \Delta h_{p2} \cdot G \cdot C_G \qquad \text{[Equation 3]}$$

Here, Qc means the air conditioning capacity (that is, cooling capacity) when the air conditioner system 1000 performs a cooling operation, $\Delta hp2$ means the difference between the enthalpy of entry and exit of the second heat exchanger 1210; 1210-1, 1210-2, . . . , 1210-N, and it means the difference between the second enthalpy h22 and the first enthalpy h21. G is the refrigerant circulation amount, and Cg is the predefined constant. Here, Cg may be arbitrarily defined according to the designer's selection, and may be defined as, for example, 1000/3600.

According to [Equation 3], the cooling capacity Qc is proportional to the product of the difference between the enthalpy of entry and exit $\Delta hp2$ of the second heat exchanger 1210; 1210-1, 1210-2, . . . , 1210-N and the amount of refrigerant circulation G, therefore, the cooling capacity Qc may be increased in proportion to the difference in the enthalpy of entry and exit $\Delta hp2$ of the second heat exchanger 1210; 1210-1, 1210-2, . . . , 1210-N when the difference between the enthalpy of entry and exit $\Delta hp2$ increases, and/or increases in proportion to the increase in the refrigerant circulation amount G when the refrigerant circulation amount G increases.

In addition, according to an embodiment, when the air conditioner system 1000 performs a heating operation, the controller 1300 may be obtained by calculating the air conditioning capacity using [Equation 4] below.

$$Q_h = \Delta h_{p1} \cdot G \cdot C_G \qquad \text{[Equation 4]}$$

Here, Qh means the air conditioning capacity (that is, heating capacity) when the air conditioner system 1000 performs a heating operation, $\Delta hp1$ means the difference between the enthalpy of entry and exit of the first heat exchanger 1111. That is, $\Delta hp1$ may mean a difference between the first enthalpy h21 and the fourth enthalpy h24 in FIG. 5. G is the refrigerant circulation amount obtained as described above, and Cg is the predefined constant. Here, Cg may be arbitrarily defined according to the designer's selection, and may be given as, for example, 1000/3600.

According to [Equation 4], it can be seen that the heating capacity Qh is given in proportion to the product of the difference $\Delta hp1$ of the enthalpy of entry and exit of the first heat exchanger 1111 and the refrigerant circulation amount G.

When the air conditioning capacity according to the operation of the air conditioner system 1000, that is, one of the cooling capacity Qc and the heating capacity Qh is calculated, the controller 1300 may calculate the efficiency for the operation of the air conditioner system 1000 based on the calculated cooling and heating capability (1315).

The efficiency of the operation of the air conditioner system 1000 can be arbitrarily defined by the designer. For example, the efficiency of the operation of the air conditioner system 1000 may be defined as the ability to heat and cool over power. In addition, the efficiency for the operation of the air conditioner system 1000 may be defined by the designer's experiment with the heating and cooling capability as an independent variable.

When the calculation of the heating and cooling capability and efficiency (1314, 1315) is completed, the controller 1300 may control the operation of the air conditioner system 1000 by generating a control signal based on at least one of the heating and cooling capability and efficiency.

For example, the controller 1300 may control the compressor 1110 based on at least one of the heating and cooling capability and efficiency to correct the size of at least one of the first pressure (i.e., high pressure) and the second pressure (i.e., low pressure).

For another example, the controller 1300 generates the time series efficiency data 1430 using at least one of the heating and cooling capability and efficiency, storing the generated time series efficiency data 1430 in the storage 1400, continuously monitoring for deterioration based on the stored time series efficiency data 1430, and/or set a maintenance plan for the air conditioner system 1000, e.g., the system air conditioner, based on the results of the monitoring and storage of results.

For another example, the controller 1300 may control the outdoor unit fan 1114 of the outdoor unit 1100 to start driving or rotate at a different angular speed.

In addition, for another example, when a plurality of the outdoor units 1100 are provided, the controller 1300 may determine the outdoor unit 1100 to be driven, or determine the number of outdoor units to be operated and control the outdoor unit 1100 to perform the operation as determined. It is also possible to determine the priority of the outdoor unit 1100 and control the outdoor unit 1100 based on this.

M addition, for another example, when the plurality of outdoor units 1100 are provided, the controller 1300 may determine the outdoor unit 1100 to be driven, or determine the number of outdoor units to be operated and control the outdoor unit 1100 to perform the operation as determined, and is also possible to determine the priority of the outdoor unit 1100 and control the outdoor unit 1100 based on the priority of the outdoor unit 1100.

As described above, only one operation of the controller 1300 may be performed, or a part of two or more of them may be performed, or all of them may be performed. The operation of the controller 1300 to be performed may be selected by the user or designer.

Each control of the controller 1300 will be described in more detail with reference to FIG. 8.

FIG. 8 is a diagram for explaining an example of a relationship between efficiency and cooling and heating capacity.

As shown in FIG. 8, the efficiency of the air conditioner system 1000, for example, the outdoor unit 1100, may change according to a change in pressure or a change in cooling capacity.

For example, when the air conditioner system 1000 performs a cooling operation, the air conditioner system 1000 may be controlled by correcting the second pressure (i.e., low pressure). Therefore, as the second pressure increases, the cooling ability decreases and the efficiency relatively increases. Conversely, when the second pressure is lowered, the cooling ability increases, but the efficiency relatively decreases.

In addition, when the air conditioner system 1000 performs a heating operation, the first pressure (that is, high pressure) control may be performed. When the first pressure increases, the cooling capacity increases, but the efficiency relatively decreases. When the pressure decreases, the cooling capacity decreases, but the efficiency relatively increases.

In addition, by using such characteristics, the controller 1300 may increase or decrease the first pressure, or increase or decrease the second pressure, thereby properly controlling the heating and cooling capacity or efficiency.

For example, when the increase in the heating and cooling capacity is given priority over the increase in efficiency, and the air conditioner system 1000 performs the cooling operation, in order to improve the cooling ability, the controller 1300 may control the compressor 1110 so that the second pressure is relatively low.

For another example, when the increase in efficiency is prioritized and the air conditioner system 1000 performs a heating operation, the controller 1300 controls the compressor 1110 and the like so that the first pressure is relatively lower to increase the efficiency. In addition, the controller 1300 may correct at least one of the first pressure and the second pressure by at least one of various methods that the designer can consider, depending on the operating condition of the air conditioner system 1000, the required air conditioning capacity, and/or efficiency.

According to an embodiment, the controller 1300 may further correct at least one of the first pressure and the second pressure by further using a separate humidity measurement unit, for example, indoor humidity obtained from a hygrometer.

For example, when the cooling operation is performed and the humidity is high, efficiency may be maintained even if the second pressure is lowered. In addition, since the comfort of a person located in the indoor space may be different depending on the humidity, it may be necessary to relatively increase the cooling ability. Accordingly, the controller 1300 may also correct at least one of the first pressure and the second pressure differently from that as described above based on the indoor humidity.

Hereinafter, a specific operation of the controller 1300 for formulating the performance data of the air conditioner system 1000 will be described with reference to FIGS. 9 to 11.

Figure 9:
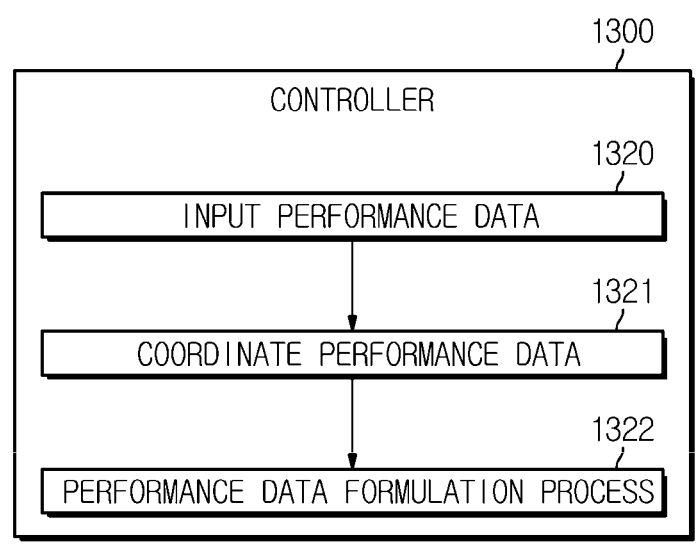
FIG. 9 is a detailed configuration diagram of a controller for formulating performance data of an air conditioner system according to an embodiment.

FIG. 9 is a detailed configuration diagram of a controller for formulating performance data of an air conditioner system according to an embodiment. FIGS. 10 and 11 are views showing performance data provided by a manufacturer of an air conditioner system according to an embodiment.

Figure 10:
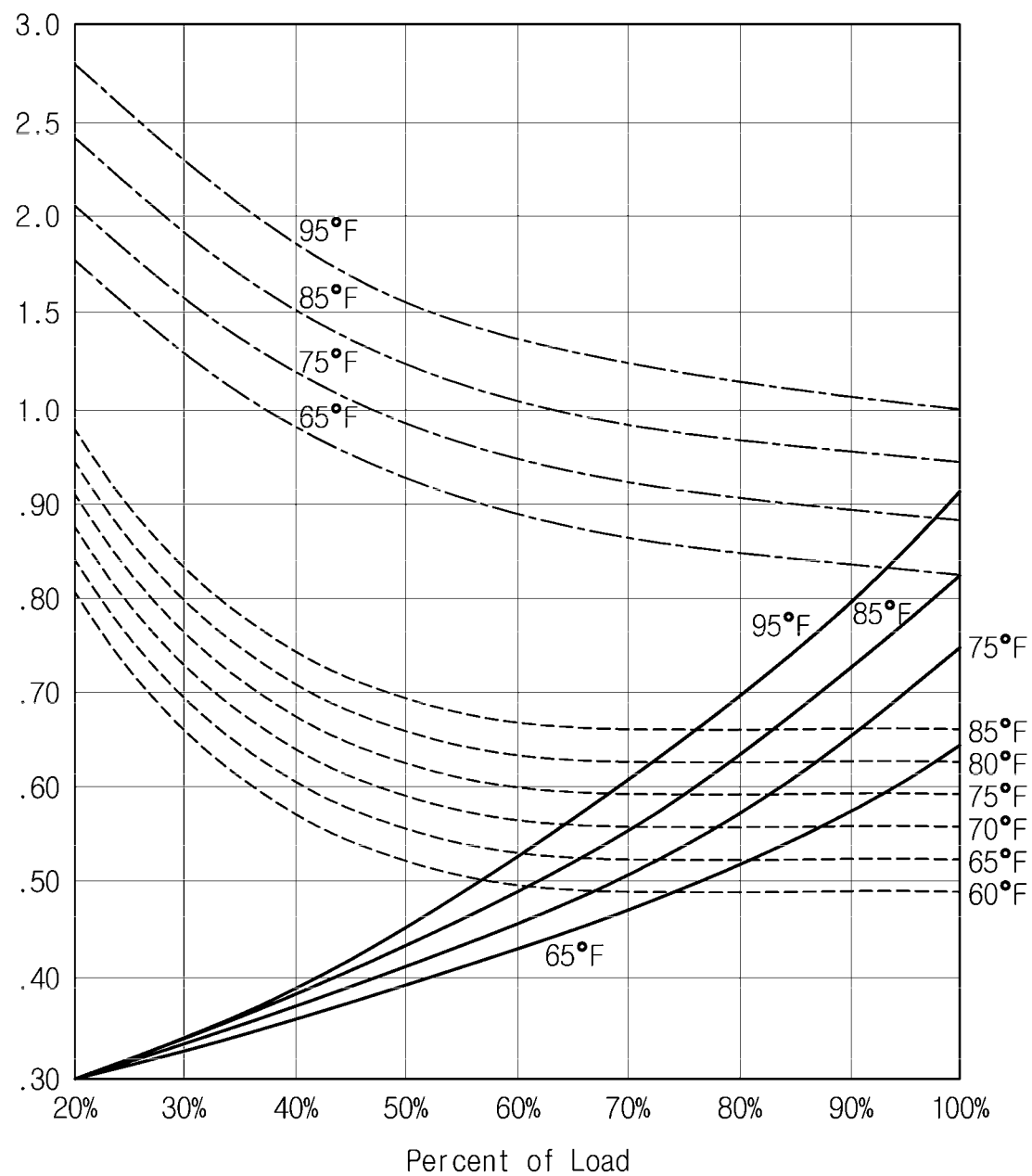

In FIG. 9, the controller 1300 may receive the device performance data 1440 provided by the manufacturer of the air conditioner system 1000 as illustrated in FIGS. 10 and 11 (1320). The device performance data 1440 may include, for example, data on a change in efficiency for each load/external/coolant condition provided by the manufacturer such as a system air conditioner or a refrigerator constituting the air conditioner system 1000.

According to an embodiment, when the device performance data 1440 is provided in the form of a picture (graph) as illustrated in FIG. 10, the controller 1300 selects a graph on the picture and coordinates it as follows (1321).

First, select (click) the origin of the graph X-axis and Y-axis, and recognize it as (0,0).

Next, select the maximum points of each axis and input the values for the maximum points to coordinate them ((0, y), (x, 0)).

Then, the distance in the picture (graph) from the origin to the maximum point is measured, and the measured distance is converted to the maximum value.

At this time, by subdividing from the origin to the maximum point, coordinates for each cell are generated based on the maximum value.

Then, select (click) on the graph to be formulated and coordinate the selected point.

Accordingly, the controller 1300 processes the device performance data 1440 input from the manufacturer through image processing or other processing (1322).

According to an embodiment, the controller 1300 provides a quadratic equation to formulate the device performance data 1440 based on the following [Equation 5], and parameters a to f of [Equation 5] are calculated as [Equation 6] below through the least squares method.

$$P = f(Q, Tcw) = \\ a \cdot Q^2 + b \cdot Tcw^2 + c \cdot Q \cdot Tcw + d \cdot Q + e \cdot Tcw + f \quad \text{[Equation 5]}$$

$$E = \sum_{i=1}^{n}(y_i - f(Q, T_{cw}))^2 \quad \text{[Equation 6]}$$

Here, P means the device efficiency (COP;-), Q means the partial load ratio (%), Tcw means the condenser side temperature (° C.), and a, b, c, d, e, and f means the parameter, and yi means the coordinate value.

In other words, the device efficiency P can be given as a function of the partial load ratio Q and the condenser side temperature Tcw.

In general, the air conditioner system 1000 is inevitably different from the performance in design at the actual site due to the installation environment and aging deterioration.

Therefore, it is necessary to calibrate the device performance of the air conditioner system 1000 to calculate the optimal operating number suitable for the partial load of the site.

Hereinafter, a specific operation of the controller 1300 that corrects the device performance of the air conditioner system 1000 and calculates the optimal operation number will be described with reference to FIGS. 12 and 14.

Figure 12:
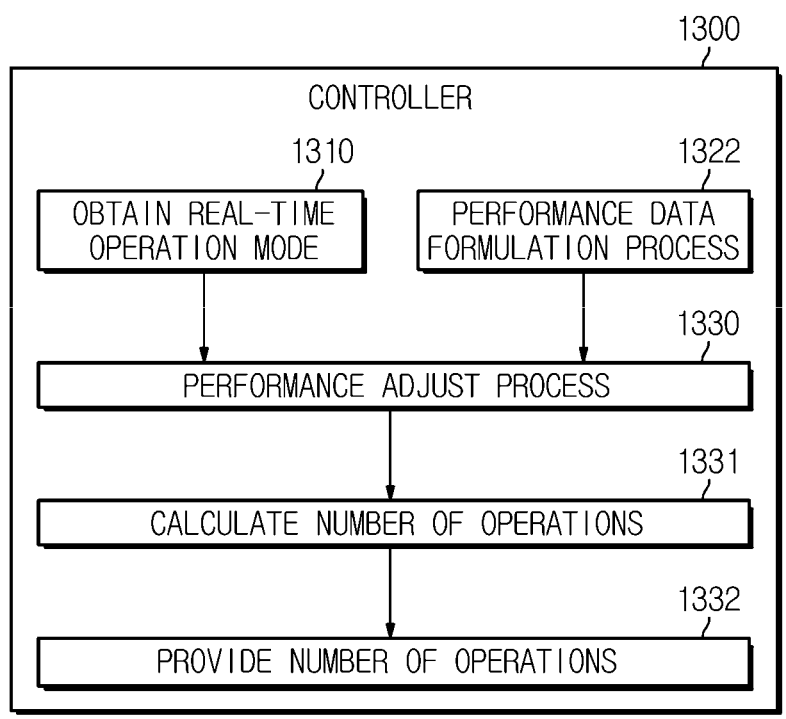
FIG. 12 is a detailed configuration diagram of a controller for calculating the operating number through performance adjustment of an air conditioner system according to an embodiment.
Figure 13:
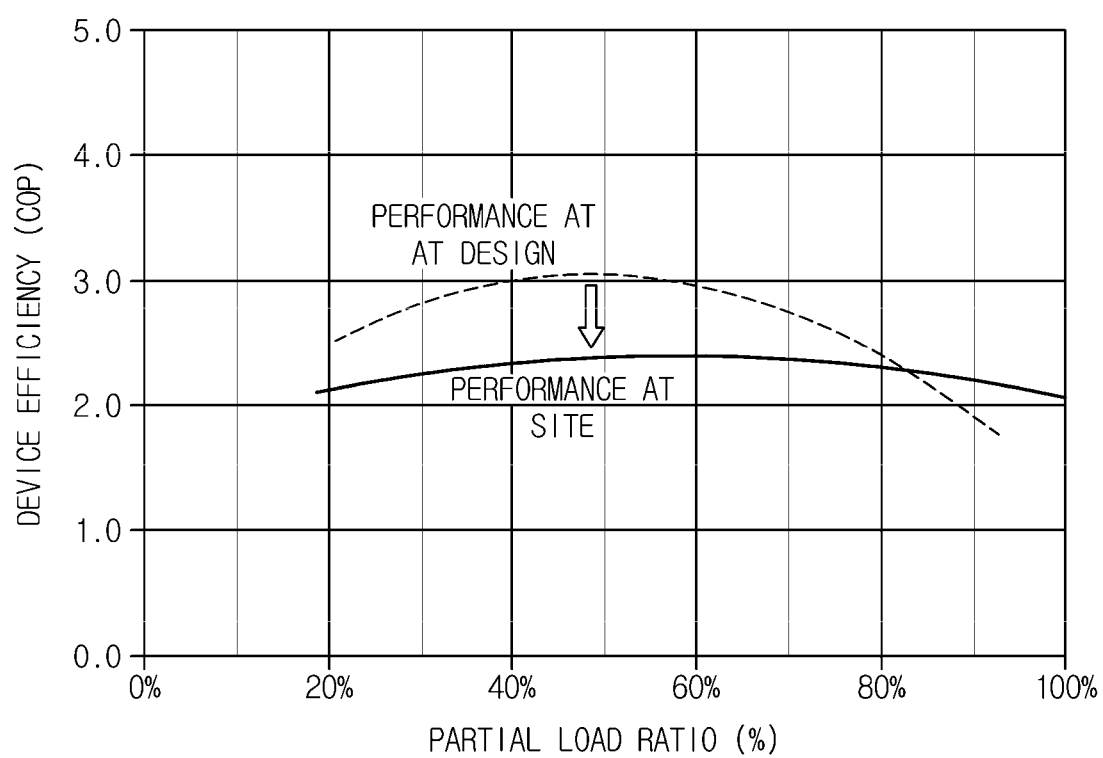
FIG. 13 is a diagram illustrating a concept for performance adjustment of an air conditioner system according to an embodiment.

FIG. 12 is a detailed configuration diagram of a controller for calculating the operating number through performance adjustment of an air conditioner system according to an embodiment. FIG. 13 is a diagram illustrating a concept for performance adjustment of an air conditioner system according to an embodiment. FIG. 14 is a diagram illustrating a graph for calculating the operating number of an air conditioner system according to an embodiment.

In FIG. 12, the controller 1300 performs a process of calibrating device performance of the air conditioner system 1000 including the system air conditioner and the refrigerator (1330) by using an input from the manufacturer and uses the performance data (1322, see FIG. 9) that has been formulated and the real-time operation data obtained (see 1310, FIG. 7).

As described in [Equation 5], the device performance calibration is performed by multiplying the device performance curve equation f (Q, Tcw) at the time of design by a calibration function C (x) consisting of a constant or a variable related to device performance deterioration. The calibration function C (x) provides a linear equation as a basis.

The calibration function C (x) squares the difference between the actual data (real-time operation data) and the existing product performance curve (manufacturer performance data) multiplied by the calibration function to calculate the parameters in the calibration function so that the sum is minimal. In this case, it can be given in the form of the following [Equation 7].

$$E = \sum_{i=1}^{n} (y_i - C(x) \cdot f(Q, T_{cw}))^2 \quad \text{[Equation 7]}$$

Here, Q means the partial load ratio (%), and Tcw means the condenser side temperature (° C.).

As described above, the controller 1300 may calculate more accurate device performance as illustrated in FIG. 13 through a calibration process through comparison of the formularized performance data and real-time operation data.

Figure 14:
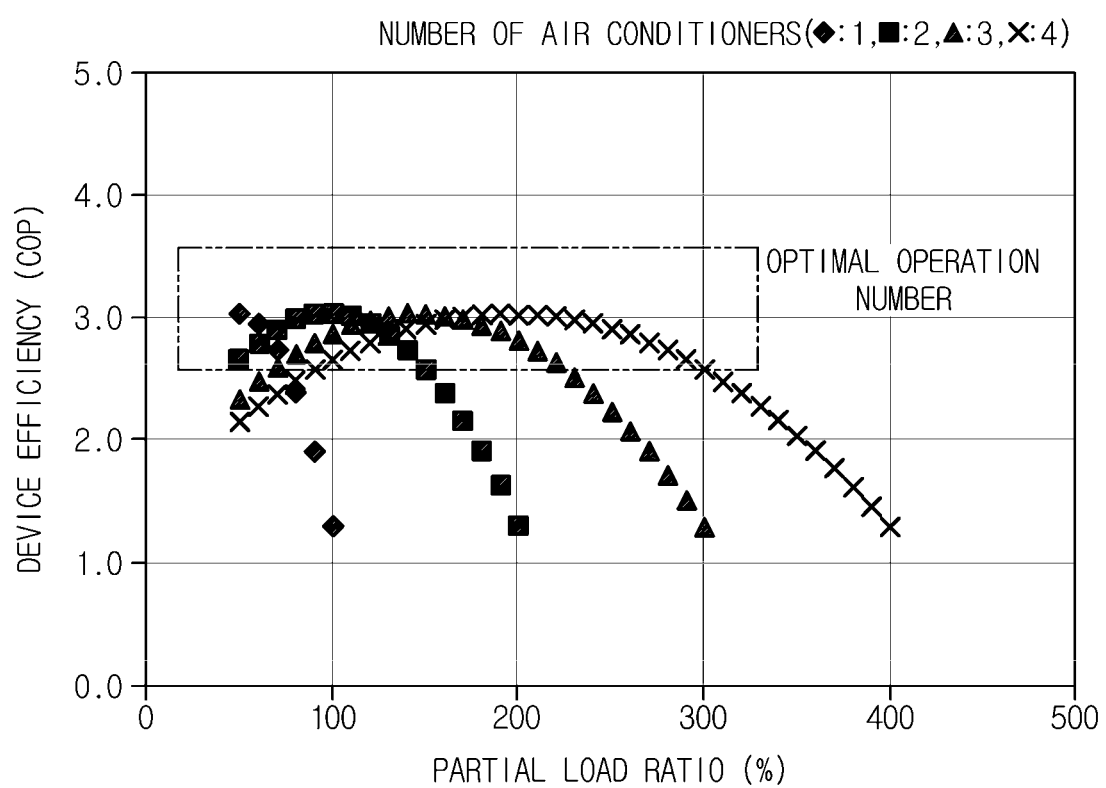
FIG. 14 is a diagram illustrating a graph for calculating the operating number of an air conditioner system according to an embodiment.

In addition, the controller 1300 may calculate the optimal operating number suitable for an actual installation environment such as an indoor load by reflecting the calibrated result, as shown in FIG. 14 (1331). The optimal number of operating units suitable for the actual installation environment may include calculating the optimized number of operating units having the highest unit efficiency (COP) for each partial load of a real building.

For example, when the air conditioner system 1000 is a system air conditioner, performance at an actual site other than a test room may calculate the performance of the system air conditioner using the flow rate and enthalpy of the compressor 1110.

As another example, when the air conditioner system 1000 is a refrigerator, performance at an actual site other than a laboratory may be calculated using the cold water flow rate and temperature difference.

In addition, by using the equation for the performance characteristics of each of the air conditioner systems 1000, it is possible to determine the number of operating units having the highest efficiency in each building load using an automatic control program.

Accordingly, the controller 1300 may provide an efficient system air conditioner (specifically, an outdoor unit) and a refrigerator such as a refrigerator suitable for a partial load of an installation site of the air conditioner system 1000 (1332).

Figure 15:
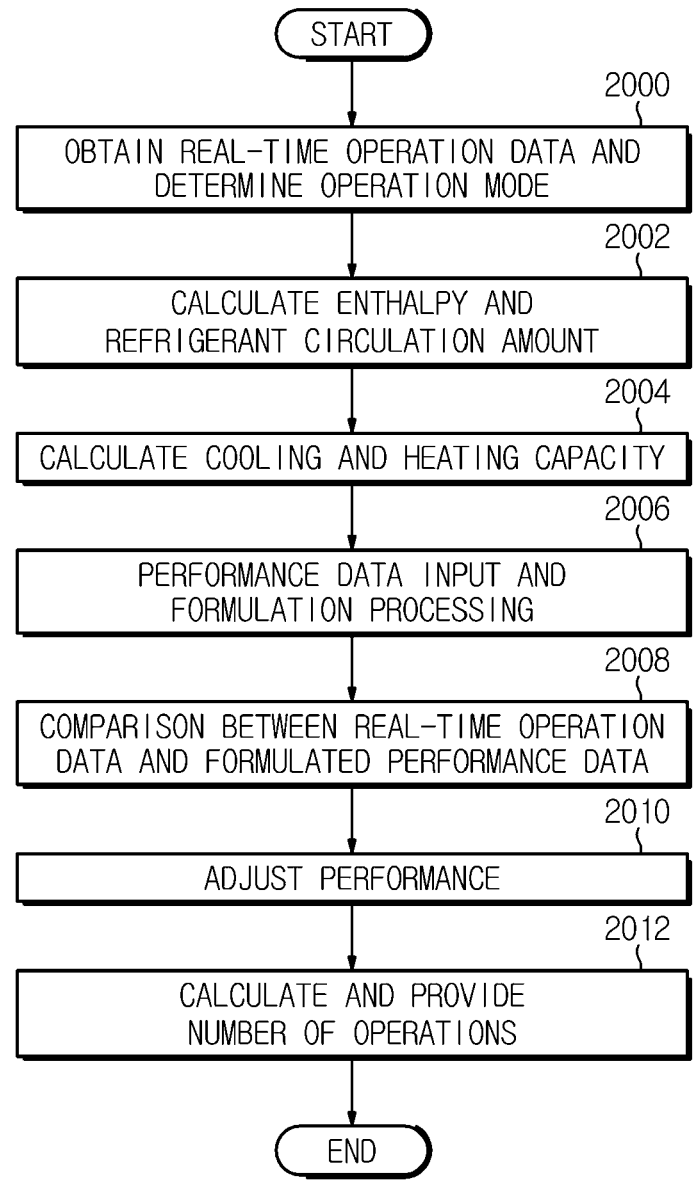
FIG. 15 is a flowchart illustrating an operation number control algorithm in an air conditioner system according to an embodiment.

Hereinafter, a method of providing the optimized operating number to an installation site by calculating real-time operation data from the air conditioner system 1000 according to an embodiment and calibrating for performance data provided by the manufacturer. This will be described with reference to FIG. 15. In FIG. 15, the air conditioner system 1000 will be described based on the system air conditioner.

FIG. 15 is a flowchart illustrating an operation number control algorithm in an air conditioner system according to an embodiment.

In FIG. 15, the controller 1300 acquires in real time the operation data necessary for calculating the heating and cooling capacity of the air conditioner system 1000 and the operating number, simultaneously or sequentially, and the controller 1300 determines the operation mode of the air conditioner system 1000 (2000). Here, the real-time operation data may include the first pressure of the refrigerant discharged from the compressor 1110, the second pressure of the refrigerant supplied to the compressor 1110, the first temperature of the refrigerant supplied to the compressor 1110, the second temperature of the discharged refrigerant from the compressor 1110, a supercooling temperature, and a rotation frequency of the compressor 1110. Also, the determination of the operation mode of the air conditioner system 1000 may include whether the operation of the air conditioner system 1000 is a cooling operation or a heating operation.

Subsequently, the enthalpy and refrigerant circulation amount of the controller 1300 may be calculated (2002). At this time, the calculated enthalpy is determined according to the operation mode. For example, when the air conditioner system 1000 performs a cooling operation, the air conditioner system 1000 calculates the enthalpy at low pressure, that is, the enthalpy of the refrigerant supplied to the second heat exchanger (indoor heat exchanger, 1210; 1210-1, 1210-2, . . . , 1210-N)) and calculates the enthalpy of the refrigerant discharged from the second heat exchanger 1210; 1210-1, 1210-2, . . . , 1210-N. When the air conditioner system 1000 performs the heating operation, the enthalpy of the refrigerant supplied to the first heat exchanger (outdoor heat exchanger, 1111) and the enthalpy of the refrigerant discharged from the first heat exchanger 1111 may be obtained.

The refrigerant circulation amount can be obtained based on the first pressure, the second pressure, the first temperature, the second temperature, the supercooling temperature, and the compressor frequency, and in this case, as described in [Equation 2], the refrigerant circulation amount may be given in the form of a quadratic function for each of the first pressure, the second pressure, the first temperature, the second temperature, the super cooling temperature, and the compressor frequency.

When the enthalpy and the refrigerant circulation amount are calculated, the controller 1300 calculates the heating and cooling capacity using the enthalpy and refrigerant circulation amount (2004). In this case, the heating and cooling capacity may be calculated using a different enthalpy depending on the cooling operation or the heating operation. According to an embodiment, as shown in [Equation 3] and [Equation 4] described above, the cooling/heating capacity may be calculated as a product of a difference in the enthalpy and the refrigerant circulation amount.

If the heating and cooling capacity is calculated, the efficiency corresponding to the cooling and heating capacity can be calculated. Efficiency may be calculated based on, for example, a ratio between the cooling and heating capacity and power (or amount of power). Efficiency can also be calculated from heating and cooling capabilities using tables or graphs obtained experimentally or empirically.

Then, the controller 1300 receives the device performance data 1440 provided by the manufacturer of the air conditioner system 1000 in the form of a picture file or a numerical value, as shown in FIGS. 10 and 11 (2006). Here, the performance data 1440 may include data on efficiency changes for each load/external/coolant condition provided by a manufacturer such as a system air conditioner or a refrigerator constituting the air conditioner system 1000.

Therefore, the controller 1300 compares the performance data (1322, see FIG. 9), which is input and processed by the manufacturer, and the obtained real-time operation data (see 1310, FIG. 7) (2008), and a process of calibrating device performance of the air conditioner system 1000 including a system air conditioner and a refrigerator is performed by comparing real-time operation data and formulated performance data (2010).

As described in [Equation 5], the device performance calibration is performed by multiplying the device performance curve equation f (Q, Tcw) at the time of design by the calibration function C (x) consisting of a constant or a variable related to device performance deterioration. The calibration function C (x) can calculate the parameters in the calibration function so that the sum of values is at a minimum by squaring the difference between the actual data (real-time operation data) and the existing device performance curve (manufacturer performance data) multiplied by the calibration function.

As such, the controller 1300 can calculate more accurate device performance through a calibration process through comparison of the formulized performance data and real-time operation data.

Then, the controller 1300 may calculate and provide the optimal operating number (specifically, the operating number of the outdoor unit and the refrigerator) suitable for an actual installation environment such as an indoor load by reflecting the calibrated result (2012). The optimal number of operating units suitable for the actual installation environment may include calculating the optimized number of operating units having the highest unit efficiency (COP) for each partial load of a real building.

Meanwhile, in an embodiment, as an example of the air conditioner system 1000, the system air conditioner is described as an example, The present disclosure is not limited to this, and it is of course possible to achieve the same objects and effects as the present disclosure in a heat source device such as a refrigerator.

The above detailed description is to illustrate the present invention. In addition, the above-described content is to describe preferred embodiments of the present invention, and the present invention can be used in various other combinations, modifications and environments. That is, it is possible to change or modify the scope of the concept of the invention disclosed herein, the scope equivalent to the disclosed contents, and/or the scope of the art or knowledge in the art. One embodiment describes the best state for implementing the technical idea of the present invention, and various changes required in specific application fields and uses of the present invention are possible. Therefore, the detailed description of the above invention is not intended to limit the present invention to the disclosed embodiments. In addition, the appended claims should be construed to include other embodiments.

The invention claimed is:

1. An air conditioner system, comprising:
    a plurality of air conditioners including a compressor, a first heat exchanger, an expansion valve, and a second heat exchanger and performing cooling and heating operations through heat exchange between a refrigerant and air;
    a high pressure sensor configured to measure a first pressure of the refrigerant discharged from the compressor;
    a low pressure sensor configured to measure a second pressure of the refrigerant supplied to the compressor;
    a suction temperature sensor configured to measure a first temperature of the refrigerant supplied to the compressor;
    a discharge temperature sensor configured to measure a second temperature of the refrigerant discharged from the compressor;
    a frequency sensor configured to measure a compressor frequency;
    a storage configured to store a device performance data representing a change in device efficiency (COP) for each load; and
    a controller configured to:
        acquire real-time operation data including the first pressure, the second pressure, the first temperature, the second temperature, and the compressor frequency,
        calculate an enthalpy difference between an enthalpy of the refrigerant supplied to the first heat exchanger or the second heat exchanger and an enthalpy of the refrigerant discharged from the first heat exchanger or the second heat exchanger, based on an operation mode of the air conditioning system,
        calculate a refrigerant circulation amount using the real-time operation data,
        calculate a cooling and heating capability of the plurality of air conditioners representing actual device performance of the plurality of air conditioners by using the enthalpy difference and the refrigerant circulation amount,
        calibrate a device performance of the plurality of air conditioners by comparing the actual device performance of the plurality of air conditioners with the device performance data stored in the storage, and
        determine a number of the plurality of air conditioners to be operated in order to maximize the device efficiency (COP) for each load of an installation site based on the calibrated device performance.

2. The air conditioner system of claim 1, wherein the plurality of air conditioners includes a system air conditioner and a refrigerator.

3. The air conditioner system of claim 2, wherein the controller obtains real-time data in a situation where the system air conditioner and the refrigerator are installed and operated in the site.

4. The air conditioner system of claim 3, wherein the device performance data is device performance data provided by a manufacturer of the system air conditioner and the refrigerator, and is provided in a figure file or a numerical form.

5. The air conditioner system of claim 4, wherein the controller receives the device performance data and formularizes the received device performance data through a processing method including image processing or mapping.

6. The air conditioner system of claim 5, wherein the controller corrects the device performance with respect to the plurality of air conditioners through comparison with the real-time operation data based on the formularized device performance data, and calculates the number of the plurality of air conditioners to be operated.

7. The air conditioner system of claim 6, wherein the controller sends feedback of the corrected results to the plurality of air conditioners, and recalculates the number of the plurality of air conditioners to be operated that meet a partial load of the installation site.

8. The air conditioner system of claim 1, wherein the plurality of air conditioners include:
    at least one outdoor unit having the compressor and the first heat exchanger; and
    a plurality of indoor units connected to the one or more outdoor units and having the expansion valve and the second heat exchanger.

9. The air conditioner system of claim 1, wherein the controller calculates the enthalpy difference between the enthalpy of the refrigerant supplied to the second heat exchanger and the enthalpy of the refrigerant discharged from the second heat exchanger when the operation mode of the plurality of air conditioners is a cooling operation, and calculates the enthalpy difference between the enthalpy of the refrigerant supplied to the first heat exchanger and the enthalpy of the refrigerant discharged from the first heat exchanger when the operation mode of the plurality of air conditioners is a heating operation.

10. A method of controlling an air conditioner system including a compressor, a first heat exchanger, an expansion valve, a second heat exchanger, a plurality of air conditioners performing heating and cooling operations through heat exchange between a refrigerant and air, the method comprising:

obtaining real-time operation data in including a first pressure of the refrigerant discharged from the compressor, a second pressure of the refrigerant supplied to the compressor, a first temperature of the refrigerant supplied to the compressor, a second temperature of the refrigerant discharged from the compressor, and a rotational frequency of the compressor;

calculating an enthalpy difference between an enthalpy of the refrigerant supplied to the first heat exchanger or the second heat exchanger and an enthalpy of the refrigerant discharged from the first heat exchanger or the second heat exchanger, based on an operation mode of the air conditioning system;

calculating a refrigerant circulation amount using the real-time operation data;

calculating a cooling and heating capability of the plurality of air conditioners representing actual device performance of the plurality of air conditioners by using the enthalpy difference and the refrigerant circulation amount formulating device performance data provided representing a change in device efficiency (COP) for each load and stored in a storage;

calibrating a device performance of the plurality of the air conditioners by comparing the actual device performance of the plurality of air conditioners with the formulated device performance data; and determining a number of the plurality of air conditioners to be operated in order to maximize the device efficiency (COP) for each load of an installation site based on the calibrated device performance.

11. The method of claim 10, wherein the plurality of air conditioners includes a system air conditioner and a refrigerator.

12. The method of claim 11, wherein the obtaining of the real-time operation data includes obtaining the real-time data in a situation where the system air conditioner and the refrigerator are installed and operated in the site.

13. The method of claim 12, wherein the receiving and formulating of the device performance data includes receiving the device performance data and formulizing the device performance data through a processing method including image processing or mapping.

14. The method of claim 12 further comprising:
feedback processing corrected results to the plurality of air conditioners, and recalculating the number of the plurality of air conditioners to be operated that meet a partial load of the installation site.

15. The method of claim 10, wherein the plurality of air conditioners includes at least one outdoor unit having the compressor and the first heat exchanger; and
a plurality of indoor units connected to the at least one outdoor unit and having the expansion valve and the second heat exchanger.

16. The method of claim 10 further comprising determining whether the operation mode of the plurality of air conditioners is a cooling operation or a heating operation,
wherein the calculating the enthalpy difference comprises:
calculating the enthalpy difference between the enthalpy of the refrigerant supplied to the second heat exchanger and the enthalpy of the refrigerant discharged from the second heat exchanger when the operation mode of the plurality of air conditioners is a cooling operation, and
calculating the enthalpy difference between the enthalpy of the refrigerant supplied to the first heat exchanger and the enthalpy of the refrigerant discharged from the first heat exchanger when the operation mode of the plurality of air conditioners is a heating operation.

* * * * *